(12) United States Patent
Onodera et al.

(10) Patent No.: US 7,536,003 B2
(45) Date of Patent: May 19, 2009

(54) COMPUTER PRODUCT, OPERATOR SUPPORTING APPARATUS, AND OPERATOR SUPPORTING METHOD

(75) Inventors: Sachiko Onodera, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 11/648,534

(22) Filed: Jan. 3, 2007

(65) Prior Publication Data

US 2008/0040113 A1   Feb. 14, 2008

(30) Foreign Application Priority Data

Jul. 31, 2006   (JP) ............... 2006-209177

(51) Int. Cl.
*H04M 3/00* (2006.01)
(52) U.S. Cl. .................. 379/267; 704/251; 379/266.07; 379/265.07
(58) Field of Classification Search .................. 704/251; 379/266.07, 267, 265.07, 265.01
See application file for complete search history.

(56) References Cited

U.S. PATENT DOCUMENTS

| | | | | |
|---|---|---|---|---|
| 6,094,673 A | * | 7/2000 | Dilip et al. ............... | 709/202 |
| 6,100,891 A | * | 8/2000 | Thorne ..................... | 715/854 |
| 6,721,416 B1 | * | 4/2004 | Farrell .................... | 379/265.07 |
| 6,856,679 B2 | * | 2/2005 | Pennington et al. ..... | 379/265.01 |
| 6,970,821 B1 | * | 11/2005 | Shambaugh et al. ...... | 704/270 |
| 2003/0154072 A1 | * | 8/2003 | Young et al. ............. | 704/9 |
| 2004/0249636 A1 | * | 12/2004 | Applebaum et al. ...... | 704/231 |
| 2005/0119893 A1 | * | 6/2005 | Shambaugh et al. ...... | 704/270 |
| 2005/0129216 A1 | * | 6/2005 | Tsujiuchi ............... | 379/265.09 |
| 2005/0141693 A1 | * | 6/2005 | Stuart et al. ........... | 379/265.06 |
| 2005/0216269 A1 | * | 9/2005 | Scahill et al. .......... | 704/270.1 |
| 2006/0023866 A1 | * | 2/2006 | Dezonno ................ | 379/265.09 |
| 2006/0095273 A1 | * | 5/2006 | Montvay et al. ......... | 705/1 |
| 2006/0233347 A1 | * | 10/2006 | Tong et al. ............ | 379/265.06 |
| 2006/0289622 A1 | * | 12/2006 | Khor et al. ............ | 235/375 |
| 2007/0083370 A1 | * | 4/2007 | Scarano et al. .......... | 704/254 |

FOREIGN PATENT DOCUMENTS

| | | |
|---|---|---|
| JP | 2003-224661 | 8/2003 |
| JP | 2004-355108 | 12/2004 |

* cited by examiner

*Primary Examiner*—Olisa Anwah
(74) *Attorney, Agent, or Firm*—Staas & Halsey LLP

(57) ABSTRACT

Speech keywords are extracted from voice data on a response that an operator has made to an inquiry from a customer while referring to case data. Response keywords to be responded to the inquiry are extracted from the case data. After detecting a common keyword in the speech and response keywords, a support keyword is extracted from the speech keywords that appears in the response at a time near the appearance of the common keyword and that does not match the response keywords. Auxiliary data is stored which includes case identification information uniquely identifying the case data, a customer level indicating a knowledge level of the customer about the inquiry, and the support keyword.

16 Claims, 26 Drawing Sheets

FIG.3

RESPONSE-DATA STORING UNIT

| RESPONSE DATA ID | CUSTOMER LEVEL | ADOPTED-CASE DATA ID | OPERATOR SPEECH DATA | CUSTOMER SPEECH DATA |
|---|---|---|---|---|
| 1 | PRIMARY | 0902 | ope_1234.wav | cus_1234.wav |
| 2 | INTERMEDIATE | 0913 | ope_1235.wav | cus_1235.wav |
| ⋮ | ⋮ | ⋮ | ⋮ | ⋮ |

OPEN INTERNET OPTION IN SECOND TOOL MENU AND SELECT THIRD CONNECTION. YOU CAN THEN FIND LAN SETTING, SO CLICK ON LAN SETTING. · · ·

CASE-DATA STORING UNIT

| CASE DATA ID | CASE DATA |
|---|---|
| 0902 | set_up.doc |
| 0914 | protect.doc |
| ⋮ | ⋮ |

Q: LET ME KNOW HOW TO SET BROWSER

A: 1. SELECT TOOL MENU
   2. OPEN INTERNET OPTION
   3. SELECT CONNECTION
   4. OPEN LAN SETTING
      ⋮

FIG.5

SPEECH-KEYWORD STORING UNIT

| RESPONSE DATA ID | SPEECH KEYWORD | SPEECH TIME ( min: sec ) |
|---|---|---|
| 1 | SECOND | 00:30 |
| | TOOL MENU | 00:35 |
| | INTERNET OPTION | 00:57 |
| | THIRD | 01:23 |
| | CONNECTION | 01:26 |
| | LAN | 02:05 |
| | ⋮ | ⋮ |
| 2 | FOURTH | 00:46 |
| | TOOL MENU | 00:49 |
| | PLURAL | 01:48 |
| | CHECKBOX | 02:41 |
| | 6 LETTERS | 02:55 |
| | PASSWORD | 03:07 |
| | ⋮ | ⋮ |
| ⋮ | ⋮ | ⋮ |

FIG.6

SEARCH-RESULT STORING UNIT

| RESPONSE DATA ID | CASE DATA |
|---|---|
| 1 | set_up.doc |
| 2 | protect.doc |
| ⋮ | ⋮ |

FIG.7

RESPONSE-KEYWORD STORING UNIT

| RESPONSE DATA ID | RESPONSE KEYWORD | PROCEDURE NUMBER |
|---|---|---|
| 1 | TOOL MENU | 1 |
| 1 | INTERNET OPTION | 2 |
| 1 | CONNECTION TAB | 3 |
| 1 | LAN | 4 |
| 2 | TOOL MENU | 1 |
| 2 | CHECKBOX | 2 |
| 2 | PASSWORD | 3 |
| ⋮ | ⋮ | ⋮ |

FIG.8

SUPPORT-KEYWORD STORING UNIT

| RESPONSE DATA ID | SUPPORT KEYWORD |
|---|---|
| 1 | SECOND |
|   | THIRD |
|   | ⋮ |
| 2 | FOURTH |
|   | PLURAL |
|   | 6 LETTERS |
|   | ⋮ |
| ⋮ | ⋮ |

FIG.9 AUXILIARY-DATA STORING UNIT

| RESPONSE DATA ID | CUSTOMER LEVEL | ADOPTED-CASE DATA ID | COMMON KEYWORD | PROCEDURE NUMBER | SUPPORT KEYWORD |
|---|---|---|---|---|---|
| 1 | PRIMARY | 0902 | TOOL MENU | 1 | SECOND |
| | | | INTERNET OPTION | 2 | BLANK |
| | | | CONNECTION TAB | 3 | THIRD |
| | | | LAN | 4 | BLANK |
| 2 | INTERMEDIATE | 0914 | TOOL MENU | 1 | FOURTH |
| | | | CHECKBOX | 2 | PLURAL |
| | | | PASSWORD | 3 | 6 LETTERS |
| ... | ... | ... | ... | ... | ... |

FIG.18

CUSTOMER-DATA STORING UNIT

| CUSTOMER ID | CUSTOMER LEVEL |
|---|---|
| A | PRIMARY |
| B | INTERMEDIATE |
| ⋮ | ⋮ |

FIG.23

39 DETERMINATION-MESSAGE STORING UNIT

| NUMBER OF PROCEDURES USED FOR EXPLANATION | NUMBER OF SUPPORT KEYWORDS | MESSAGE |
|---|---|---|
| BLANK | BLANK | SUCCEED |
| LARGE | LARGE | EXPLANATION IS QUITE REDUNDANT |
| LARGE | EQUAL | EXPLANATION IS REDUNDANT |
| LARGE | SMALL | SAMPLE RESPONSE IS NOT ALWAYS APPROPRIATE |
| EQUAL | LARGE | EXPLANATION IS REDUNDANT |
| EQUAL | EQUAL | TRY MAKING MORE APPROPRIATE EXPLANATION |
| EQUAL | SMALL | TRY MAKING MORE POLITE EXPLANATION |
| SMALL | LARGE | REFER TO SAMPLE RESPONSE MORE OFTEN |
| SMALL | EQUAL | EXPLANATION IS STILL INSUFFICIENT |
| SMALL | SMALL | EXPLANATION IS TOO SIMPLE |

COMPUTER PRODUCT, OPERATOR SUPPORTING APPARATUS, AND OPERATOR SUPPORTING METHOD

BACKGROUND OF THE INVENTION

1. Field of the Invention

The present invention generally relates to a technology for supporting an operator to respond to an inquiry.

2. Description of the Related Art

In the manufacturers' industry, an organization referred to as "call center" is provided to receive and respond to customers' inquiries about products. In the call center, operators respond to customers' inquiries.

The customers who inquire of operators in the call center differ in knowledge level. The knowledge level (hereinafter, "customer level") means the level of knowledge about a product or a service for which each customer makes an inquiry. Because of the difference in customer level, each operator is forced to flexibly respond to a customer's inquiry based on operator's knowledge and experience. For example, the operator estimates the customer level and needs to be politic in responding to the customer's inquiry according to the customer level.

In recent years, the following problems have occurred in the call center. The job separation rate at which operators separate from their jobs in one year is as high as 20% to 30%. Furthermore, it takes every operator more than one year to become full-fledged. For these reasons, most of the operators on duty are new or inexperienced. It is difficult for the new or inexperienced operator to flexibly respond to inquiries of customers at various customer levels. However, unless operators appropriately respond to customers' inquiries whether they are experienced or inexperienced, customer satisfaction disadvantageously falls and the efficiency of operation for responding to customers' inquiries in the call center is disadvantageously deteriorated.

Considering them, techniques for supporting operator have been proposed. For example, Japanese Patent Application Laid-Open No. 2003-224661 discloses an electronic-information providing method. According to the conventional electronic-information providing method, an electronic manual to which an operator is to refer in response to a customer's inquiry, a correspondence table in which information disclosure levels are made to correspond to combinations of customer levels and proficiencies of operators, and a rule for editing the electronic manual based on each of the information disclosure levels are stored. Keywords are extracted by performing a voice recognition process on an actual dialogs between the customer and the operator. The electronic manuals are narrowed down based on the extracted keywords, and the customer level of a customer is determined. The available information disclosure level is determined based on the determined customer level and the proficiency of the operator to respond to the customer's inquiry. The electronic manual thus narrowed down is edited according to the rule based on the information disclosure level, and the resultant electronic manual is displayed to the operator.

As another example, Japanese Patent Application Laid-Open No. 2004-355108 discloses an operator supporting program. With the conventional operator supporting program, a response to each customer's inquiry is made to correspond to a combination of keywords and a plurality of responses to the inquiry are prepared according to customer levels. The responses are stored in a response content database (DB). A keyword is extracted from an actual dialog between the customer and the operator by a voice recognition process. Responses corresponding to a combination of keywords are extracted from the response content DB. Further, a response content corresponding to the customer level and determined based on the combination of keywords is displayed to the operator.

According to the conventional techniques, sample responses are prepared according to the customer levels. However, it is still up to each operator as to how to use an expression for the response exceeding what are shown in the sample responses. As a result, sample responses for making an appropriate response according to each customer level are not always provided.

Furthermore, it is necessary to manually input rules and data for creating sample responses finally displayed to each operator. Because of the vast number, of sample responses to customers' inquiries about ordinary products, the need to create sample responses to inquiries about a new product when the new product is manufacture, and the like, it is disadvantageously difficult to realize appropriate responses according to customer levels.

SUMMARY OF THE INVENTION

It is an object of the present invention to at least partially solve the problems in the conventional technology.

According to an aspect of the present invention, an operator supporting apparatus that supports an operator who responds to an inquiry from a customer while referring to case data, includes a speech-keyword extracting unit that extracts words of the operator as speech keywords from response data on a record of contents that the operator has spoken in response to an inquiry from a customer while referring to case data, a response-keyword extracting unit that extracts response keywords from the case data corresponding to a response to the inquiry, a support-keyword extracting unit that matches the speech keywords with the response keywords to detect a common keyword, and extracts a support keyword from the speech keywords that appears in the response data at a time near appearance of the common keyword and that does not match the response keywords, and an auxiliary-data generating unit that generates auxiliary data that includes case identification information uniquely identifying the case data, a customer level indicating a knowledge level of the customer about the inquiry, and the support keyword.

According to another aspect of the present invention, an operator supporting method for supporting an operator who responds to an inquiry from a customer while referring to case data, includes extracting words of the operator as speech keywords from response data on a record of contents that the operator has spoken in response to an inquiry from a customer while referring to case data, extracting response keywords from the case data corresponding to a response to the inquiry, detecting a common keyword in the speech and response keywords by matching the speech keywords with the response keywords, extracting a support keyword from the speech keywords that appears in the response data at a time near appearance of the common keyword and that does not match the response keywords, and generating auxiliary data that includes case identification information uniquely identifying the case data, a customer level indicating a knowledge level of the customer about the inquiry, and the support keyword.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of information stored in a response-data storing unit shown in FIG. 2;

FIG. 5 is an example of information stored in a speech-keyword storing unit shown in FIG. 2;

FIG. 6 is an example of information stored in a search-result storing unit shown in FIG. 2;

FIG. 7 is an example of information stored in a response-keyword storing unit shown in FIG. 2;

FIG. 8 is an example of information stored in a support-keyword storing unit shown in FIG. 2;

FIG. 9 is an example of information stored in an auxiliary-data storing unit shown in FIG. 2;

FIG. 18 is an example of information stored in a customer-data storing unit shown in FIG. 17;

FIG. 23 is an example of information stored in a determination-message storing unit shown in FIG. 22;

DETAILED DESCRIPTION OF THE PREFERRED EMBODIMENTS

Exemplary embodiments of the present invention will be explained hereinafter with reference to the accompanying drawings.

Figure 1:
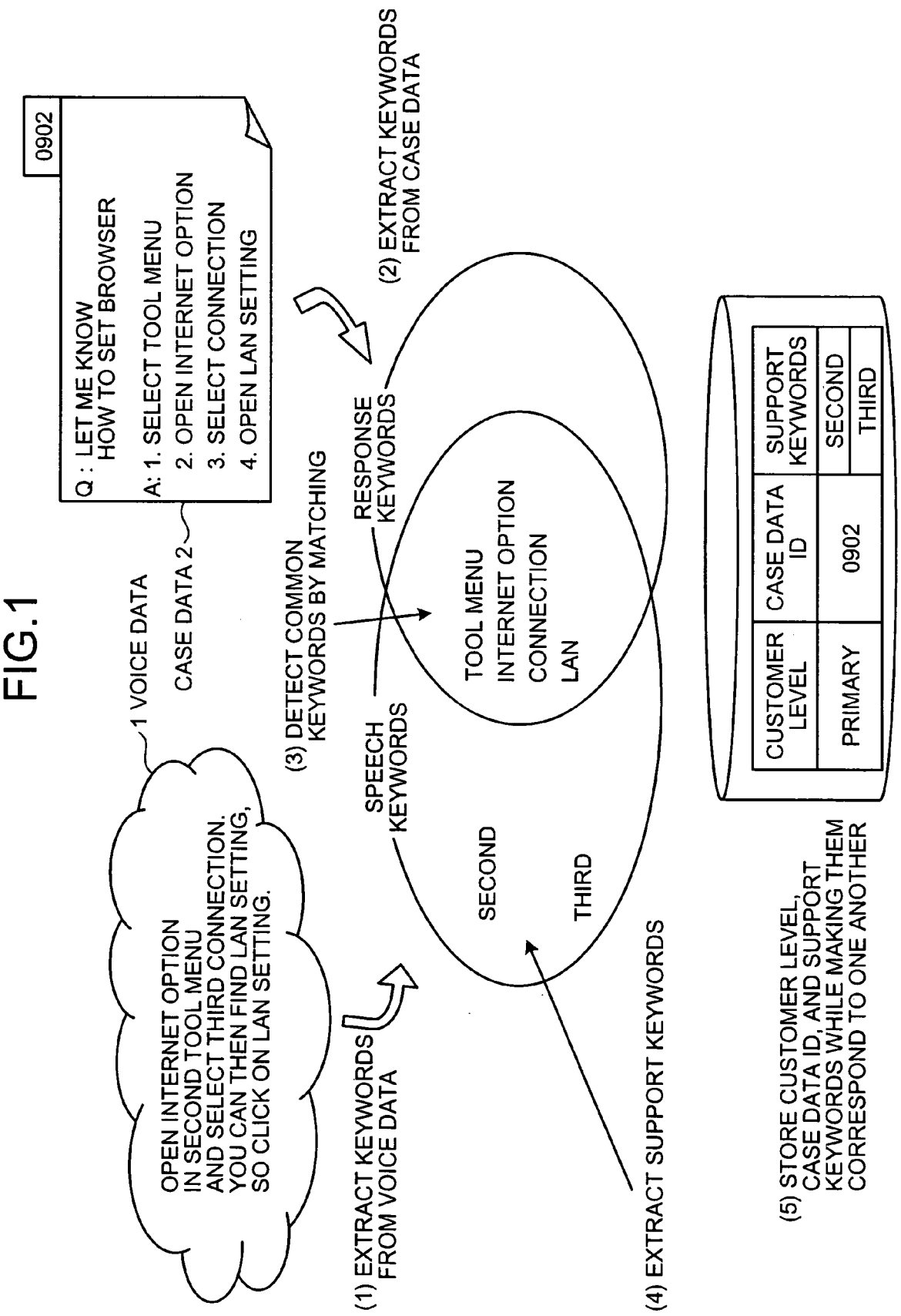
FIG. 1 is a schematic for explaining the outline and features of an auxiliary-data generating apparatus according to a first embodiment of the present invention.

FIG. 1 is a schematic for explaining the outline and features of an auxiliary-data generating apparatus 10 according to a first embodiment of the present invention.

The auxiliary-data generating apparatus 10 generally supports an operator who responds to a customer's inquiry received by a call center while referring to case data. The auxiliary-data generating apparatus 10 is mainly characterized by allowing easily realizing an accurate response of the operator according to a customer level.

The main feature of the auxiliary-data generating apparatus 10 will be explained in detail. The auxiliary-data generating apparatus 10 extracts speech keywords from response data on a response actually made by the operator to an inquiry of a predetermined customer while referring to predetermined case data. The speech keywords are keywords uttered by the operator, and the response data is the recorded content of the response.

As shown in FIG. 1, for example, the auxiliary-data generating apparatus 10 extracts such speech keywords as "second", "tool menu", "Internet option", "third", "connection", and "LAN" from voice data 1. The voice data 1 serves as the response data and corresponds to the recorded content of the response actually made by the operator to the inquiry of the predetermined customer (see (1) in FIG. 1).

The auxiliary-data generating apparatus 10 extracts response keywords, which are keywords to be uttered by the operator as a response to the customer's inquiry, from the predetermined case data.

As shown in FIG. 1, for example, the auxiliary-data generating apparatus 10 extracts such response keywords as "tool menu", "Internet option", "connection", and "LAN" from case data 2 to which the operator refers when the operator responds to the inquiry (see (2) in FIG. 1).

The auxiliary-data generating apparatus 10 detects common keywords to the speech keywords and the response keywords from the speech keywords. Thereafter, the auxiliary-data generating apparatus 10 extracts the speech keywords, which are uttered at time near the time when the operator uttered the common keywords and which are not common to the speech keywords and the response keywords, as support keywords.

As shown in FIG. 1, for example, the auxiliary-data generating apparatus 10 detects such common keywords as "tool menu", "Internet option", "connection", and "LAN" by matching the speech keywords extracted from the voice data 1 to the response keywords extracted from the case data 2 (see (3) in FIG. 1). Subsequently, the auxiliary-data generating apparatus 10 extracts, as the support keywords, "second" uttered by the operator near "tool menu" and "third" uttered by the operator near "connection" (see (4) in FIG. 1).

Finally, the auxiliary-data generating apparatus 10 generates auxiliary data. The auxiliary data includes case identification information for uniquely identifying the predetermined case data, a customer level indicating the knowledge level of the predetermined customer about the response content, and the support keywords.

As shown in FIG. 1, for example, the auxiliary-data generating apparatus 10 generates the auxiliary data in which the support keywords "second" and "third", the customer level "primary", and the identification information "0902" for uniquely identifying the case data 2 are made to correspond to one another.

As described above, according to the first embodiment, the auxiliary-data generating apparatus 10 generates the auxiliary data including the support keywords that reinforce the case data 2 based on the actual operator's response. The auxiliary-data generating apparatus 10 does not require the operator to manually generate the auxiliary data. Thus, the operator can easily make an appropriate response to the customer's inquiry according to the customer level.

Figure 2:
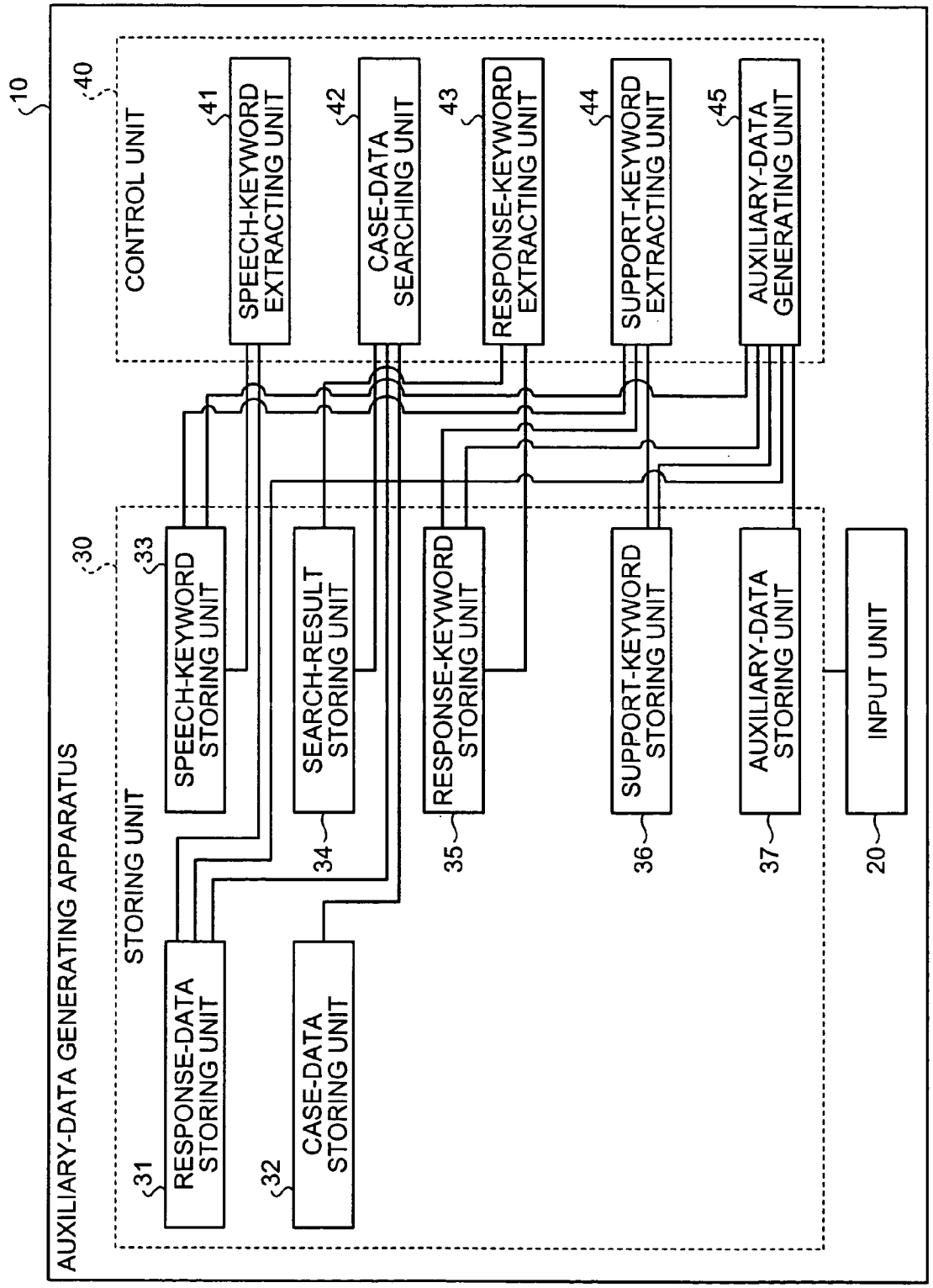
FIG. 2 is a block diagram of the auxiliary-data generating apparatus.

FIG. 2 is a block diagram of the auxiliary-data generating apparatus 10. The auxiliary-data generating apparatus 10 includes an input unit 20, a storing unit 30, and a control unit 40.

The input unit 20 includes a keyboard and a microphone, and receives input of various pieces of information. For example, the input unit 20 receives an actual dialog between the operator and the customer who inquires of the call center or the like through the microphone as voice data.

The storing unit 30 stores therein data used for various processes performed by the control unit 40. The storing unit 30 includes, particularly as constituent elements closely related to the first embodiment, a response-data storing unit 31, a case-data storing unit 32, a speech-keyword storing unit 33, a search-result storing unit 34, a response-keyword storing unit 35, a support-keyword storing unit 36, and an auxiliary-data storing unit 37.

The response-data storing unit 31 stores therein the response data that is the recorded content of the actual dialog between the customer who inquires of the call center and the operator who responds to the customer's inquiry. Specifically, the response-data storing unit 31 receives the response data, the customer level indicating the knowledge level of the customer in respect of the content of the customer's response, an adopted-case data ID, and a response data ID from the input unit 20. The adopted-case data ID is identification information for uniquely identifying the case data adopted by the operator in response to the inquiry. The response data ID is identification information for uniquely identifying the response data. The response-data storing unit 31 also stores therein the received pieces of data while making them correspond to one another as shown in FIG. 3.

FIG. 3 is an example of information stored in the response-data storing unit 31. As shown in FIG. 3, for example, the response-data storing unit 31 stores therein the response data ID "1", the customer level "primary", the adopted-case data ID "0902", operator speech data "ope_1234.wav", and customer speech data "cus_1234.wav" while making them correspond to one another. The operator speech data is the voice data only on operator's voice in the actual dialog between the operator and the customer. The customer speech data is the voice data only on customer's voice in the actual dialog between the operator and the customer. For sake of convenience, the response data is divided into the operator speech data and the customer speech data in FIG. 4. Alternatively, the response data can be data on recorded content of the dialog between the operator and the customer.

The case-data storing unit 32 stores therein the case data to which the operator refers when the operator responds to the client's inquiry. Specifically, the case-data storing unit 32 stores therein case data and a case data ID, which is identification information for uniquely identifying the case data while making them correspond to each other as shown in FIG. 4.

Figure 4:
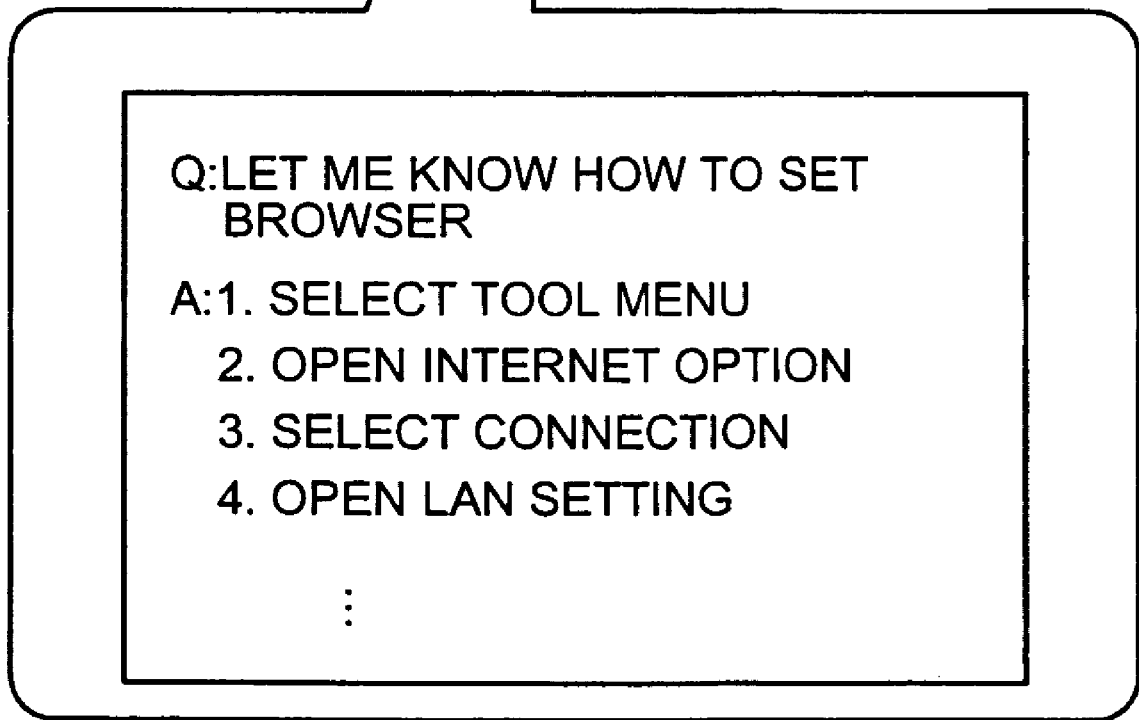
FIG. 4 is an example of information stored in a case-data storing unit shown in FIG. 2.

FIG. 4 is an example of information stored in the case-data storing unit 32. As shown in FIG. 4, for example, the case-data storing unit 32 stores therein the case data ID "0902" and the case data "set_up.doc" (an electronic document in which an inquiry and a response to the inquiry are described according to each procedure) while making them correspond to each other.

The speech-keyword storing unit 33 stores therein the speech keywords extracted by a speech-keyword extracting unit 41 of the control unit 40 from the response data. Specifically, the speech-keyword storing unit 33 receives the speech keywords, speech time, which is information on the relative positional relationship among the speech keywords, and the response data ID from the speech-keyword extracting unit 41. The speech-keyword storing unit 33 stores therein the received pieces of data while making them correspond to one another as shown in FIG. 5.

FIG. 5 is an example of information stored in the speech-keyword storing unit 33. As shown in FIG. 5, for example, the speech-keyword storing unit 33 stores therein the response data ID "1", such speech keywords "second" and "tool menu" uttered by the operator in the operator speech data "ope_1234.wav" stored in the response-data storing unit 31, such speech time as "00:30" and "00:35" when the operator uttered the respective speech keywords "second", and "tool menu" in the operator-speech data "ope_1234.wav" while making them correspond to one another.

The search-result storing unit 34 stores therein case data searched by a case-data searching unit 42 of the control unit 40. Specifically, the search-result storing unit 34 receives the case data and the response data ID from the case-data searching unit 42. The search-result storing unit 34 stores therein the case data and the response data ID while making them correspond to each other as shown in FIG. 6.

FIG. 6 is an example of information stored in the search-result storing unit 34. As shown in FIG. 6, for example, the search-result storing unit 34 stores therein the response data ID "1" and the case data "set_up.doc" while making them correspond to each other.

The response-keyword storing unit 35 stores therein the response keywords extracted by a response-keyword extracting unit 43 of the control unit 40 from the case data. Specifically, the response-keyword storing unit 35 receives the response keywords, procedure numbers that are information indicating in which procedure each of the response keywords is described, and the response data ID from the response-keyword extracting unit 43. The response-keyword storing unit 35 stores the received response keywords, procedure numbers, response data ID while making them correspond to one another as shown in FIG. 7.

FIG. 7 is an example of information stored in the response-keyword storing unit 35. As shown in FIG. 7, for example, the response-keyword storing unit 35 stores therein the response data ID "1", such response keywords as "tool menu" and "Internet option" described in the case data "set_up.doc" stored in the search-result storing unit 34, and such procedure numbers as "1" and "2" related to the respective keywords "tool menu" and "Internet option" while making them correspond to one another.

The support-keyword storing unit 36 stores support keywords extracted by a support-keyword extracting unit 44 of the control unit 40. Specifically, the support-keyword storing unit 36 receives the support keywords and the response data ID from the support-keyword extracting unit 44. The support-keyword storing unit 36 stores therein the received support keywords and response data ID while making them correspond to each other as shown in FIG. 8.

FIG. 8 is an example of information stored in the support-keyword storing unit 36. As shown in FIG. 8, for example, the support-keyword storing unit 36 stores the response data ID "1" and such support keywords as "second" and "third" while making them correspond to each other.

The auxiliary-data storing unit 37 stores auxiliary data generated by an auxiliary-data generating unit 45 of the control unit 40. Specifically, the auxiliary-data storing unit 37 receives the auxiliary data in which the response data ID, the client level, the adopted-case data ID, the common keywords, the procedure numbers, and the support keywords are made to correspond to one another from the auxiliary-data generating unit 45. The auxiliary-data storing unit 37 stores the received auxiliary data as shown in FIG. 9.

FIG. 9 is an example of information stored in the auxiliary-data storing unit 37. As shown in FIG. 9, for example, the auxiliary-data storing unit 37 stores the auxiliary data in which the response data ID "1", the client level "primary", the adopted-case data ID "0902", such common keywords as "tool menu" and "Internet option", the procedure numbers "1" and "2", and such support keywords as "second" are made to correspond to one another.

The control unit 40 controls the auxiliary-data generating apparatus 10 and performs various processes. The control unit 40 includes, as constituent elements of close relevance to the first embodiment of the present invention, the speech-keyword extracting unit 41, the case-data searching unit 42, the response-keyword extracting unit 43, the support-keyword extracting unit 44, and the auxiliary-data generating unit 45.

The speech-keyword extracting unit 41 extracts speech keywords, which are keywords uttered by the operator, from the response data which is the recorded content of the response actually made by the operator to the accepted inquiry of the predetermined customer while referring to the predetermined case data.

Specifically, the speech-keyword extracting unit 41 reads the response data from the response-data storing unit 31 when the response data is stored in the response-data storing unit 31. The speech-keyword extracting unit 41 extracts the speech keywords from the operator speech data, and the speech time when the operator uttered each of the speech keywords in the operator speech data. The speech-keyword extracting unit 41 outputs the response data ID, the speech keywords, and the speech time to the speech-keyword storing unit 33.

Figure 10:
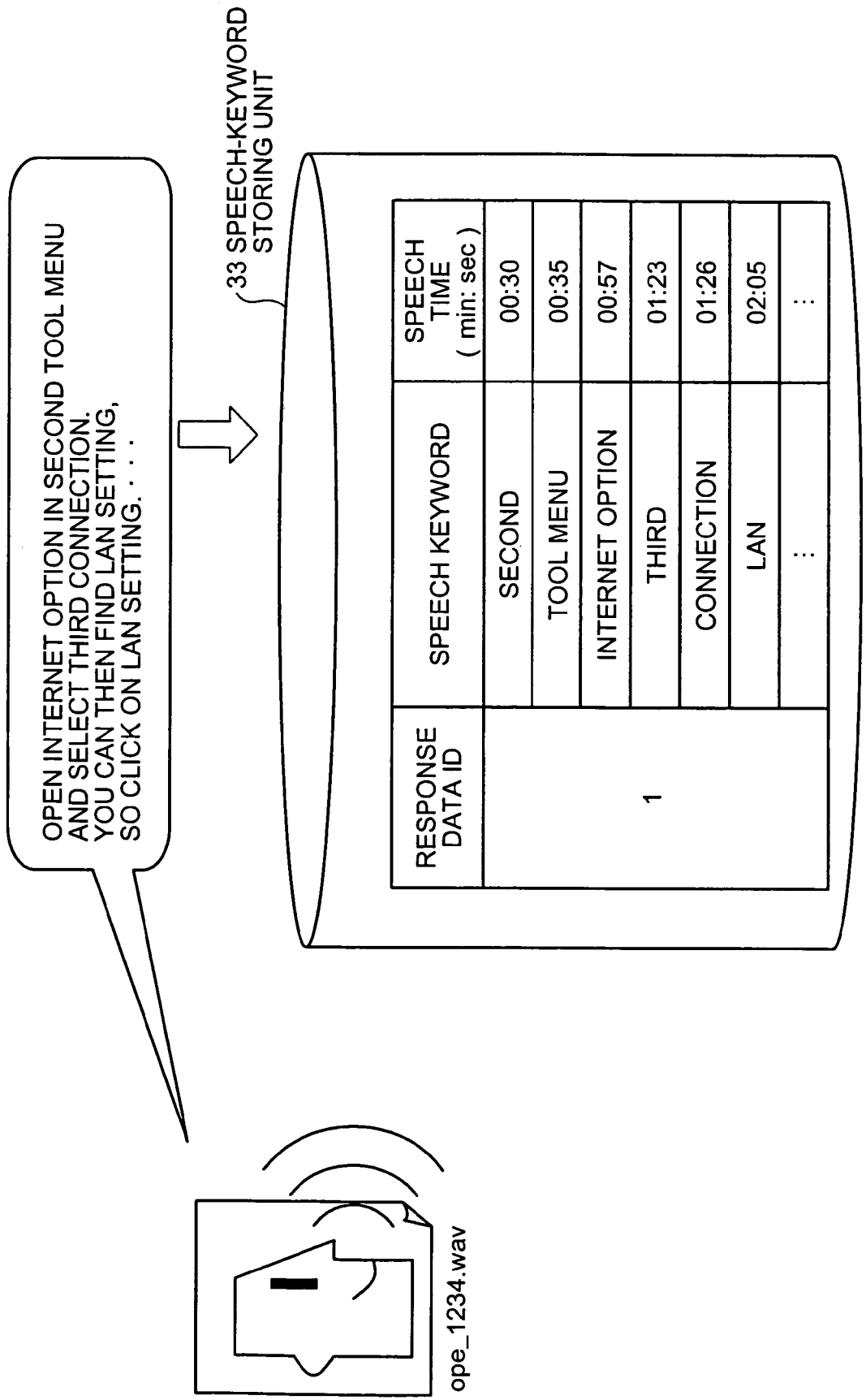
FIG. 10 is a schematic for explaining an example in which a speech-keyword extracting unit shown in FIG. 2 extracts speech keywords.

FIG. 10 is a schematic for explaining an example in which the speech-keyword extracting unit 41 extracts the speech keywords. As shown in FIG. 10, for example, the speech-keyword extracting unit 41 analyzes the voice data "ope_1234.wav" read from the response-data storing unit 31 by voice recognition technique or the like. The speech-keyword extracting unit 41 thereby extracts such words as "second", "tool menu" as the speech keywords. The speech-keyword extracting unit 41 also extracts such speech time as "00:30" and "00:35" when the operator uttered the respective speech keywords from the same voice data "ope_1234.wav". The speech-keyword extracting unit 41 outputs the speech keywords, the speech time, and the response data ID "1" to the speech-keyword storing unit 33.

The case-data searching unit 42 searches the case-data storing unit 32 for case data based on the case data ID stored in the response-data storing unit 31, and outputs a search result to the search-result storing unit 34. Specifically, the case-data searching unit 42 reads the response data from the response-data storing unit 31 when the response data is stored in the response-data storing unit 31. The case-data searching unit 42 also searches the case-data storing unit 32 for case data based on the adopted-case data ID, and acquires the corresponding case data. The case-data searching unit 42 outputs the case data and the case data ID to the search-result storing unit 34.

The response-keyword extracting unit 43 extracts response keywords, which the operator is to utter as the response to the customer's inquiry, from the predetermined case data. Specifically, the response-keyword extracting unit 43 reads the case data from the search-result storing unit 34 when the case data is stored in the search-result storing unit 34, and extracts the response keywords from the case data. The response-keyword extracting unit 43 also extracts the procedure numbers that area information indicating in which procedure each of the response keywords is described in the case data. The response-keyword extracting unit 43 outputs the response data ID, the response keywords, and the procedure numbers to the response-keyword storing unit 35.

Figure 11:
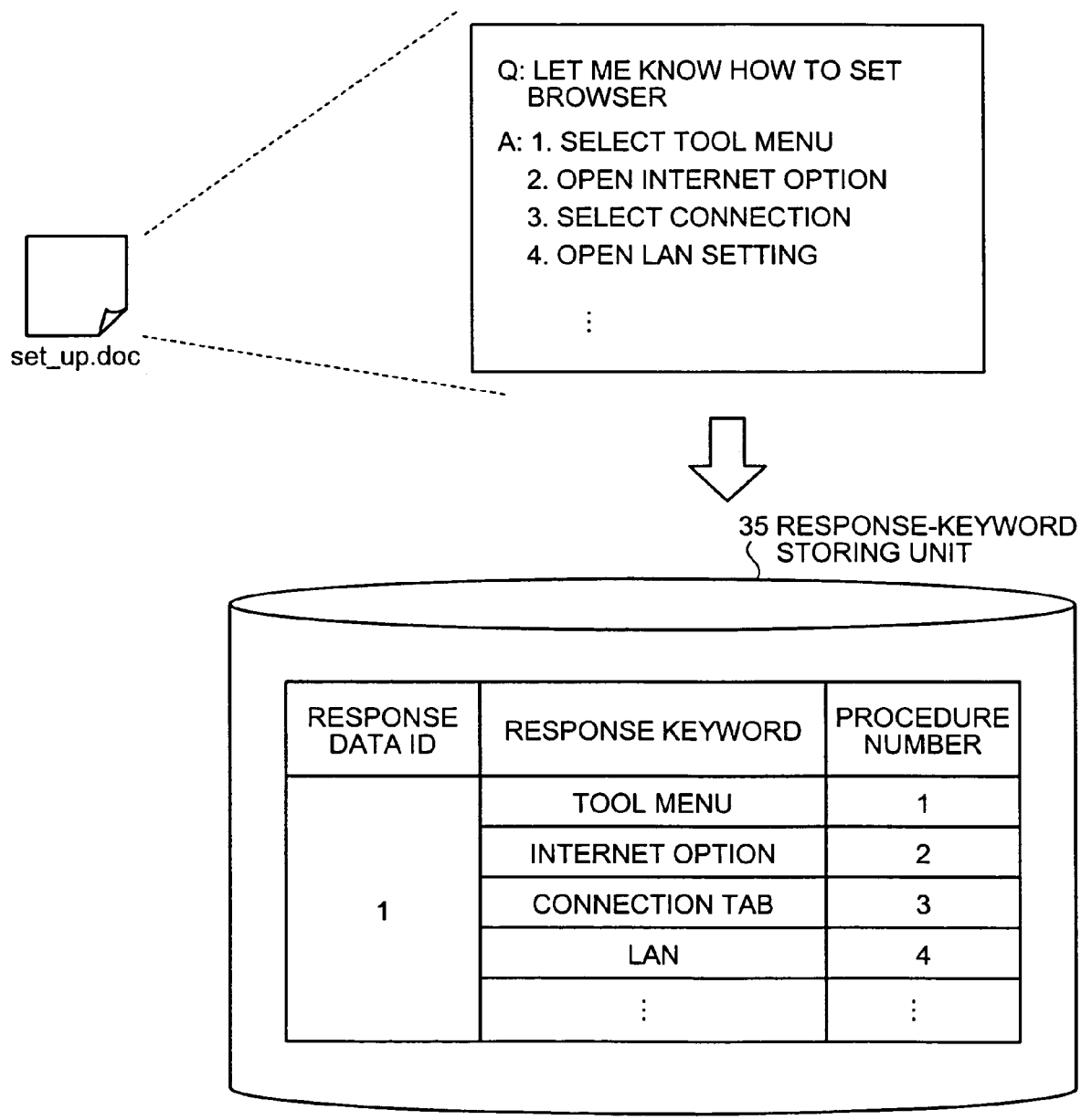
FIG. 11 is a schematic for explaining an example in which a response-keyword extracting unit shown in FIG. 2 extracts response keywords.

FIG. 11 is a schematic for explaining an example in which the response-keyword extracting unit 43 extracts the response keywords. As shown in FIG. 11, for example, the response-keyword extracting unit 43 analyzes the case data "set_up.doc" read from the search-result storing unit 34 by morphological analysis technique or the like. The response-keyword extracting unit 43 thereby extracts such words as "tool menu" and "Internet option" as the response keywords. The response-keyword extracting unit 43 also extracts the procedure numbers "1", "2" and the like indicating the procedures in which the respective response keywords are described in the case data "set_up.doc" from the case data "set_up.doc". The response-keyword extracting unit 43 outputs the response keywords, the procedure numbers, and the response data ID to the response-keyword storing unit 35.

The support-keyword extracting unit 44 extracts the common keywords from the speech keywords extracted by the speech-keyword extracting unit 41. The common keywords are common to the speech keywords and the response keywords extracted by the response-keyword extracting unit 43. Thereafter, the support-keyword extracting unit 44 extracts the keywords, which the operator uttered near the time when the operator uttered the common keywords and which are not common to the speech keywords and the response keywords, as the support keywords.

Specifically, the support-keyword extracting unit 44 reads the speech keywords and the response keywords from the speech-keyword storing unit 33 and the response-keyword storing unit 35 when pieces of data made to correspond to the same response data ID are stored in the speech-keyword storing unit 33 and the response-keyword storing unit 35, respectively. The support-keyword extracting unit 44 detects the common keywords by matching the speech keywords to the response keywords. Thereafter, the support-keyword extracting unit 44 extracts the keywords from the speech keywords, as the support keywords, which the operator uttered near the speech time of the common keywords and does not common to and the response keywords. The support-keyword extracting unit 44 outputs the response data ID and the support keywords to the support-keyword storing unit 36.

Figure 12:
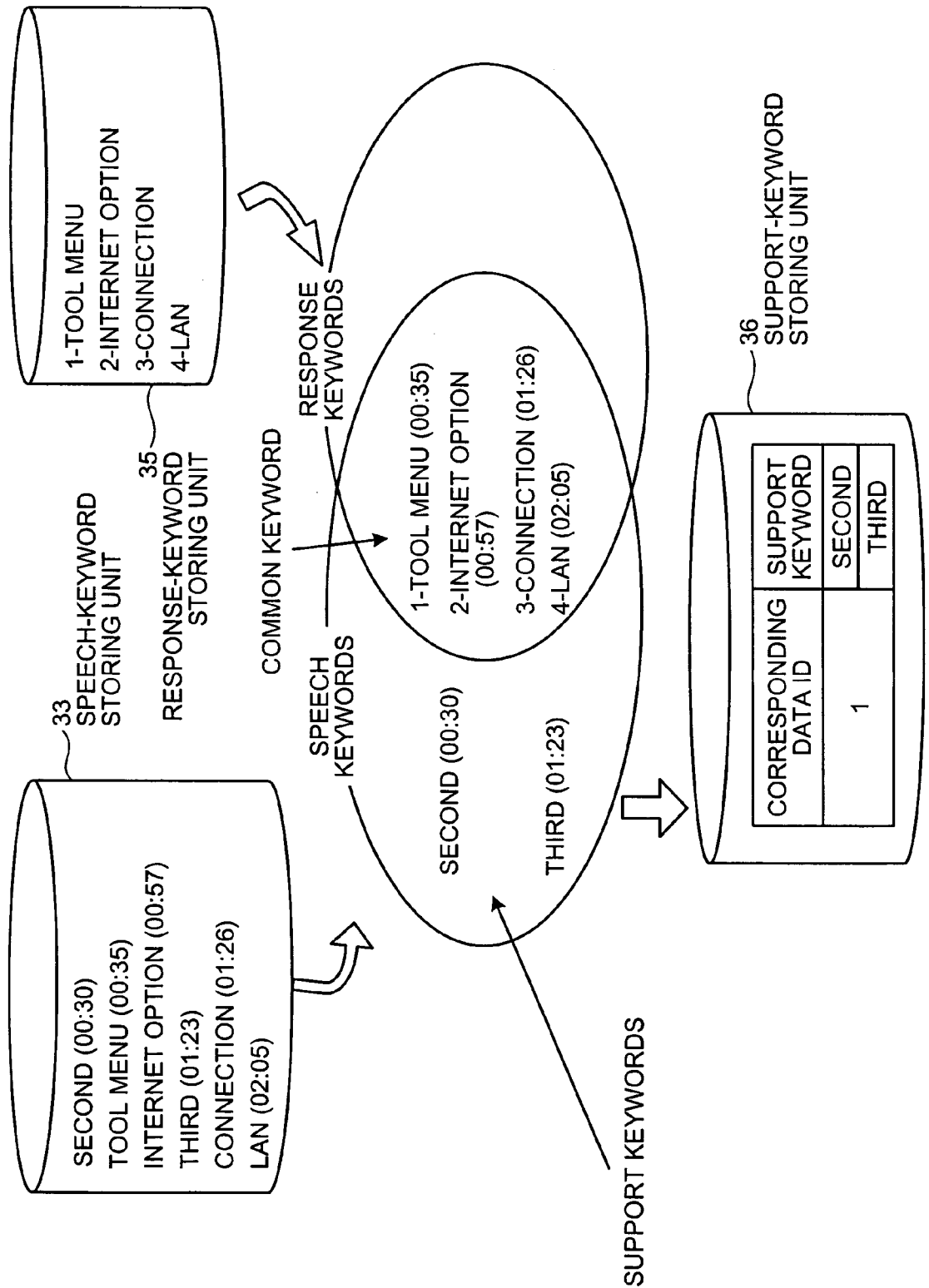
FIG. 12 is a schematic for explaining an example in which a support-keyword extracting unit shown in FIG. 2 extracts support keywords.

FIG. 12 is a schematic for explaining an example in which the support-keyword extracting unit 44 extracts the support keywords. As shown in FIG. 12, for example, the support-keyword extracting unit 44 matches the speech keywords such as "second" and "tool menu" read from the speech-keyword storing unit 33 with the response keywords such as "tool menu" and "Internet option" read from the response-keyword storing unit 35. The support-keyword extracting unit 44 thereby detects the common keywords such as "tool menu" and "Internet option". The support-keyword extracting unit 44 extracts the keywords such as "second" and "third", which the operator uttered near the speech time such as "00:35" and "00:57" of the detected common keywords, and which are not common to the speech keywords and the response keywords, as the support keywords. The support-keyword extracting unit 44 outputs the support keywords and the response data ID "1" to the support-keyword storing unit 36.

The auxiliary-data generating unit 45 generates the auxiliary data that includes case identification information, the customer level, and the support keywords extracted by the support-keyword extracting unit 44. The case identification information is information uniquely identifying the predetermined data. The customer level indicates the knowledge level of the predetermined customer about the content of the customer's inquiry.

Specifically, pieces of data made to correspond to the same response data ID are stored in the response-data storing unit 31, the speech-keyword storing unit 33, the response-keyword storing unit 35, and the support-keyword storing unit 36. If so, the auxiliary-data generating unit 45 reads the response keywords, the speech keywords, the response keywords, and the support keywords from the response-data storing unit 31, the speech-keyword storing unit 33, the response-keyword storing unit 35, and the support-keyword storing unit 36, respectively. The auxiliary-data generating unit 45 generates the auxiliary data in which the response data ID, the client level, and adopted-case data ID, the common keywords, the procedure numbers, and the support keywords are made to correspond to one another. The auxiliary-data generating unit 45 outputs the generated auxiliary data to the auxiliary-data storing unit 37.

Figure 13:
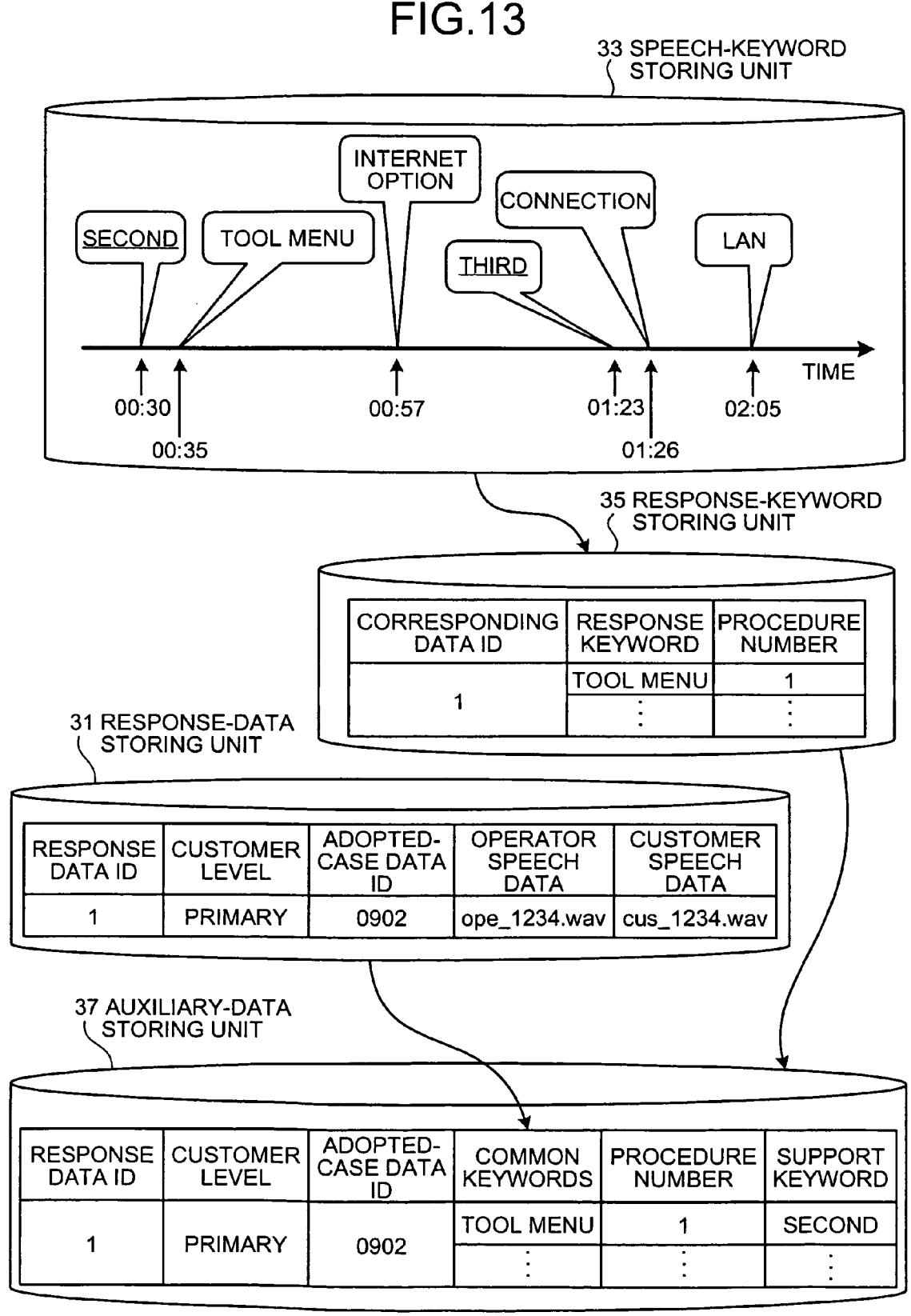
FIG. 13 is a schematic for explaining an example in which the auxiliary-data generating unit generates auxiliary data.

FIG. 13 is a schematic for explaining an example in which the auxiliary-data generating unit 45 generates the auxiliary data. As shown in FIG. 13, for example, the auxiliary-data generating unit 45 reads the support keywords from the support-keyword storing unit 36. The auxiliary-data generating unit 45 recognizes that the speech keywords "tool menu" stored in the speech-keyword storing unit 33 is the common keyword. The auxiliary-data generating unit 45 also recognizes the speech keyword "second" uttered before the speech time "00:35" of the "tool menu" as the support keyword for the "tool menu". The auxiliary-data generating unit 45 also recognizes that there is no support keyword for the speech keywords "Internet option" because of no speech keywords from the speech time "00:57" of the "Internet option" to the speech time "00:35" of the "tool menu".

The auxiliary-data generating unit 45 reads the response keywords from the response-keyword storing unit 35 and acquires the procedure number "1" corresponding to the common keywords "tool menu". The auxiliary-data generating unit 45 also reads the response data corresponding to the same response data ID as that to which the speech keywords and the response keywords correspond from the response-data storing unit 31. The auxiliary-data generating unit 45 acquires the customer level "primary" and the adopted-case data ID "0902". The auxiliary-data generating unit 45 generates the auxiliary data by making the response data ID "1", the customer level "primary", the adopted-case data ID "0902", the common keywords "tool menu", the procedure number "1", and the support keyword "second" correspond to one another. The auxiliary-data generating unit 45 outputs the auxiliary data to the auxiliary-data storing unit 37.

Figure 14:
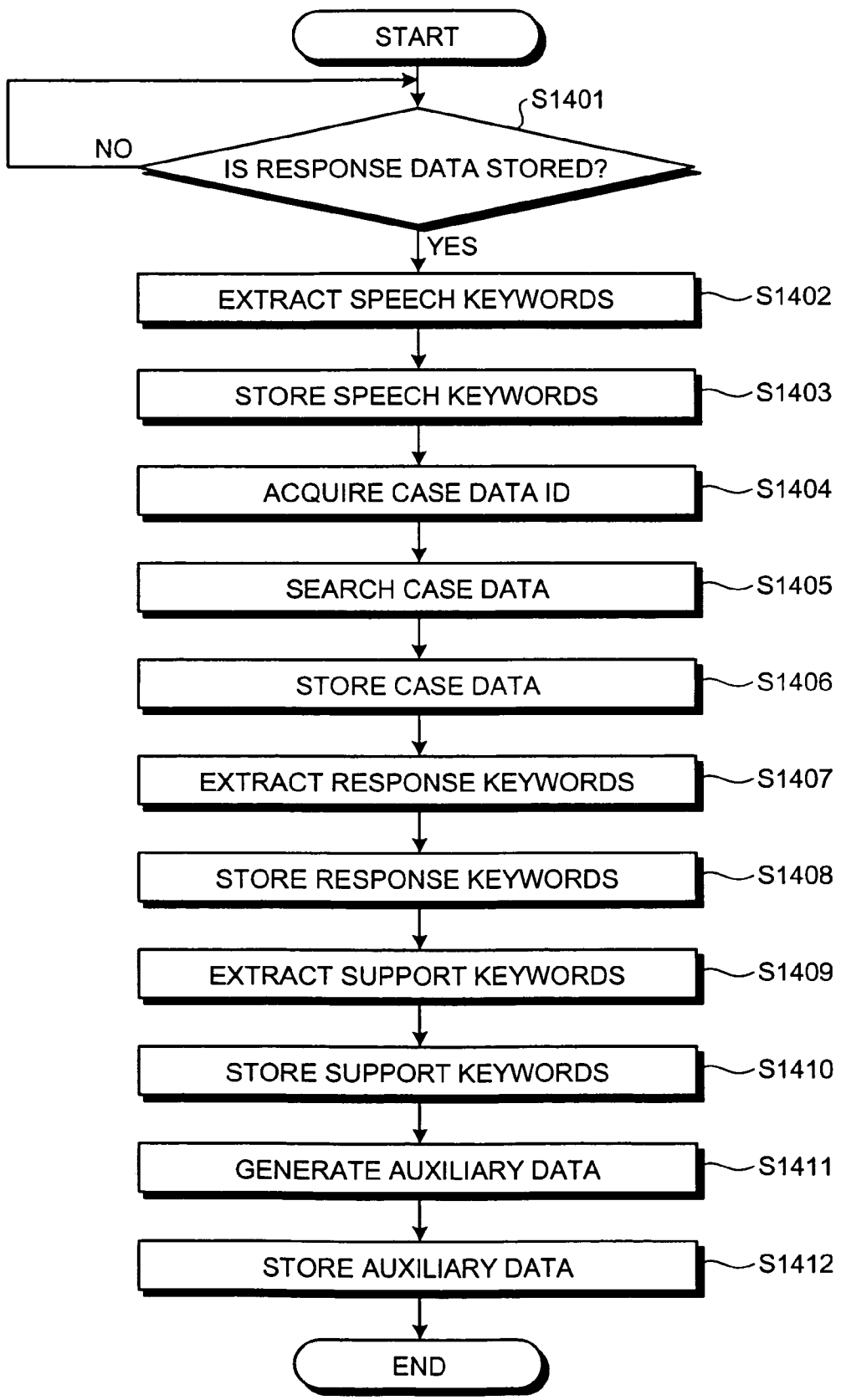
FIG. 14 is a flowchart of an auxiliary-data generation process performed by the auxiliary-data generating apparatus.

FIG. 14 is a flowchart of an auxiliary-data generation process performed by the auxiliary data generating apparatus 10. When the response data is stored in the response-data storing unit 31 (Yes at step S1401), the speech-keyword extracting unit 41 reads the response data from the response-data storing unit 31 and extracts the speech keywords (step S1402). The speech-keyword extracting unit 41 stores the speech keywords in the speech-keyword storing unit 33 (step S1403).

Meanwhile, when the case-data searching unit 42 reads the response data from the response-data storing unit 31 and acquires the case data ID (step S1404), the case-data searching unit 42 searches the case-data storing unit 32 for the case data based on the case data ID (step S1405). The case-data searching unit 42 stores the acquired case data in the search-result storing unit 34 (S1406).

The response-keyword extracting unit 43 reads the case data from the search-result storing unit 34 and extracts the response keywords (step S1407). The response-keyword extracting unit 43 stores the response keywords in the response-keyword storing unit 35 (step S1408).

The support-keyword extracting unit 44 reads the speech keywords and the response keywords from the speech-keyword storing unit 33 and the response-keyword storing unit 35, respectively, and extracts the support keywords (step S1409). The support-keyword extracting unit 44 stores the support keywords in the support-keyword storing unit 36 (step S1410).

Finally, the auxiliary-data generating unit 45 reads the response data, the speech keywords, and the response keywords from the response-data storing unit 31, the speech-keyword storing unit 33, and the response-keyword storing unit 35, respectively. In addition, the auxiliary-data generating unit 45 generates the auxiliary data (step S1411). The auxiliary-data generating unit 45 stores the auxiliary data in the auxiliary-data storing unit 37 (step S1412). The auxiliary-data generation process is thus finished.

As explained so far, according to the first embodiment, the speech keywords are extracted from the operator speech data, the response keywords are extracted from the case data, and the common keywords common to the speech keywords and the response keywords are extracted from the speech keywords. Thereafter, the support keywords are extracted from the speech keywords that are uttered before the speech time of the common keywords and that do not match the response keywords. The auxiliary data including the adopted-case data ID, the customer level, and the support keywords is generated. It is, therefore, possible to easily realize an accurate response of the operator according to the customer level. Namely, the auxiliary data including the support keywords, which are to support the case data, is generated from the content of the actual response of the operator according to the customer level. Moreover, the auxiliary data is not generated manually. Therefore, by causing the operator to use the auxiliary data, it is possible to easily realize an accurate response of the operator according to the customer level.

In the first embodiment, the auxiliary-data generating apparatus 10 sequentially stores the generated auxiliary-data. In a second embodiment of the present invention, an auxiliary-data generating apparatus that separately stores excellent auxiliary data high in utility value by selecting predetermined auxiliary data from among the generated auxiliary data will be explained.

Figure 15:
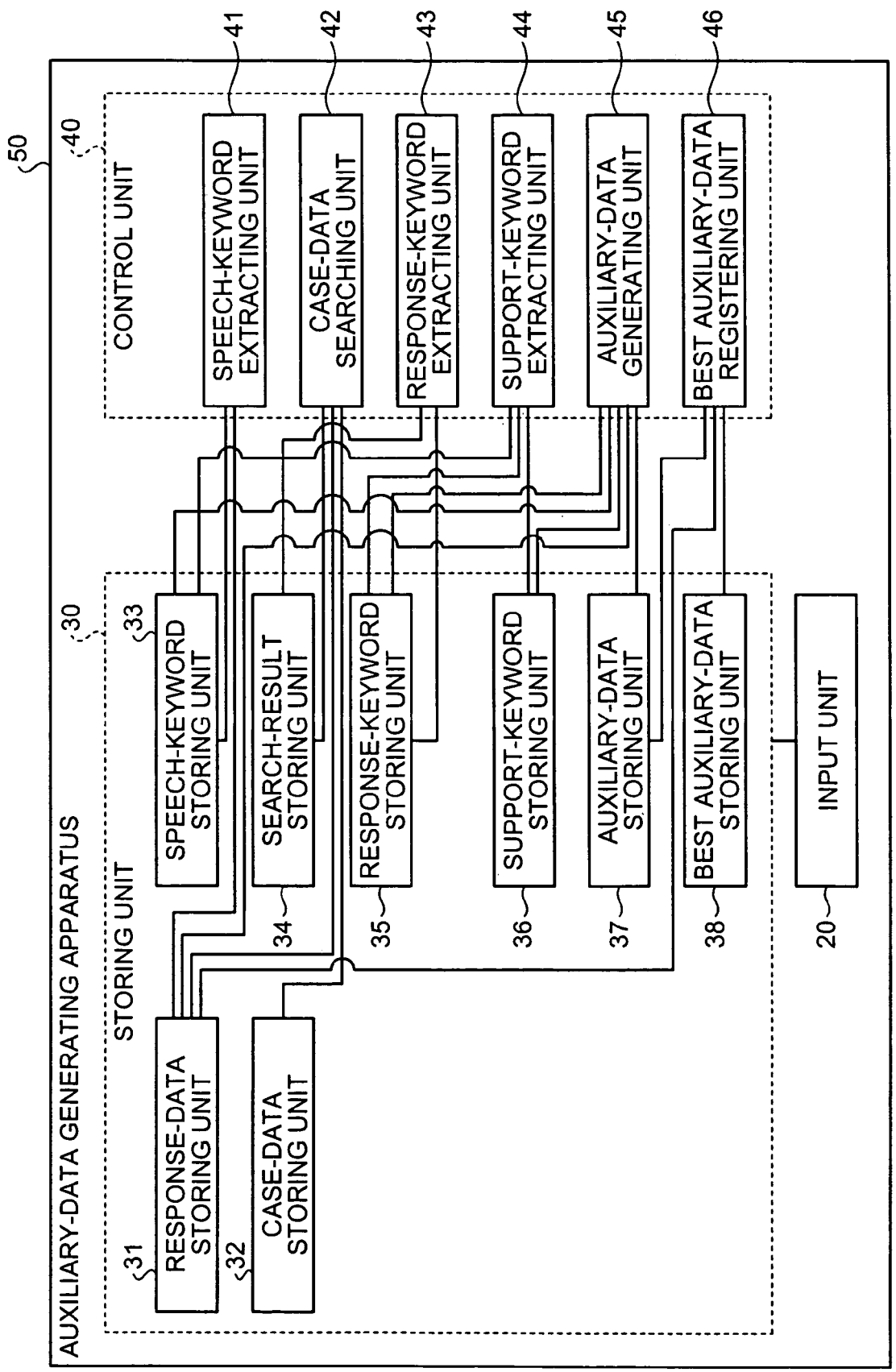
FIG. 15 is a block diagram of an auxiliary-data generating apparatus according to a second embodiment of the present invention.

FIG. 15 is a block diagram of an auxiliary-data generating apparatus 50 according to the second embodiment. The auxiliary-data generating apparatus 50 includes the input unit 20, the storing unit 30, and the control unit 40 similarly to the first embodiment. Constituent elements that operate similarly to those according to the first embodiment are denoted by the same reference symbols, respectively and will not be repeatedly explained herein. Namely, only a best auxiliary-data storing unit 38 and a best auxiliary-data registering unit 46 will be explained.

The best auxiliary-data storing unit 38 stores therein best auxiliary data determined to be best auxiliary data by the best auxiliary-data registering unit 46. Specifically, the best auxiliary-data storing unit 38 stores therein the best auxiliary data in which the response data ID, the customer level, the adopted-case data ID, the common keywords, the procedure numbers, and the support keywords are made to correspond to one another, similarly to the auxiliary-data storing unit 37 according to the first embodiment.

The best auxiliary-data registering unit 46 acquires best auxiliary data equal in the case data ID and the customer level to newly generated auxiliary data (hereinafter, "new auxiliary data") among the best auxiliary data stored in the best auxiliary-data storing unit 38. Thereafter, the best auxiliary-data registering unit 46 determines whether the new auxiliary data is superior to the best auxiliary data. If determining that the new auxiliary data is superior to the best auxiliary data, the best auxiliary-data registering unit 46 registers the new auxiliary data as the best auxiliary data in place of the best auxiliary data stored in the best auxiliary-data storing unit 38. If the best auxiliary data equal in the case data ID and the customer level to the new auxiliary data is not stored in the best auxiliary-data storing unit 38, the best auxiliary-data registering unit 46 determines that the new auxiliary data is the best to date and registers the new auxiliary data in the best auxiliary-data storing unit 38.

If the best auxiliary data equal in the case data ID and the customer level to the new auxiliary data is stored in the best auxiliary-data storing unit 38, the best auxiliary-data registering unit 46 reads response data made to correspond to the same response data IDs as those to which the best auxiliary data and the new auxiliary data are made to correspond from the response-data storing unit 31, respectively, based on the response data IDs included in the best auxiliary data and the new auxiliary data. The best auxiliary-data registering unit 46 acquires the numbers of customer's brief responses and speech durations corresponding to the respective response IDs from the response-data storing unit 31. The best auxiliary-data registering unit 46 determines whether the new auxiliary data is superior to the best auxiliary data by comparing the best auxiliary data with the new auxiliary data based on the response data, the numbers of customer's brief responses, and the speech durations. The best auxiliary-data registering unit 46 registers either the new auxiliary data or the best auxiliary data determined to be superior as the best auxiliary data. The best auxiliary-data registering unit 46 makes the comparison as follows. If the customer consents to the operator's explanation, it is considered that the number of customer's brief responses increases. Therefore, the best auxiliary-data registering unit 46 determines that the auxiliary data corresponding to more brief responses of the customer is superior. If the customer is more satisfied with the operator's explanation, it is considered that the speech duration is shorter. Therefore, the best auxiliary-data registering unit 46 determines that the auxiliary data corresponding to the shorter speech duration is superior.

Figure 16:
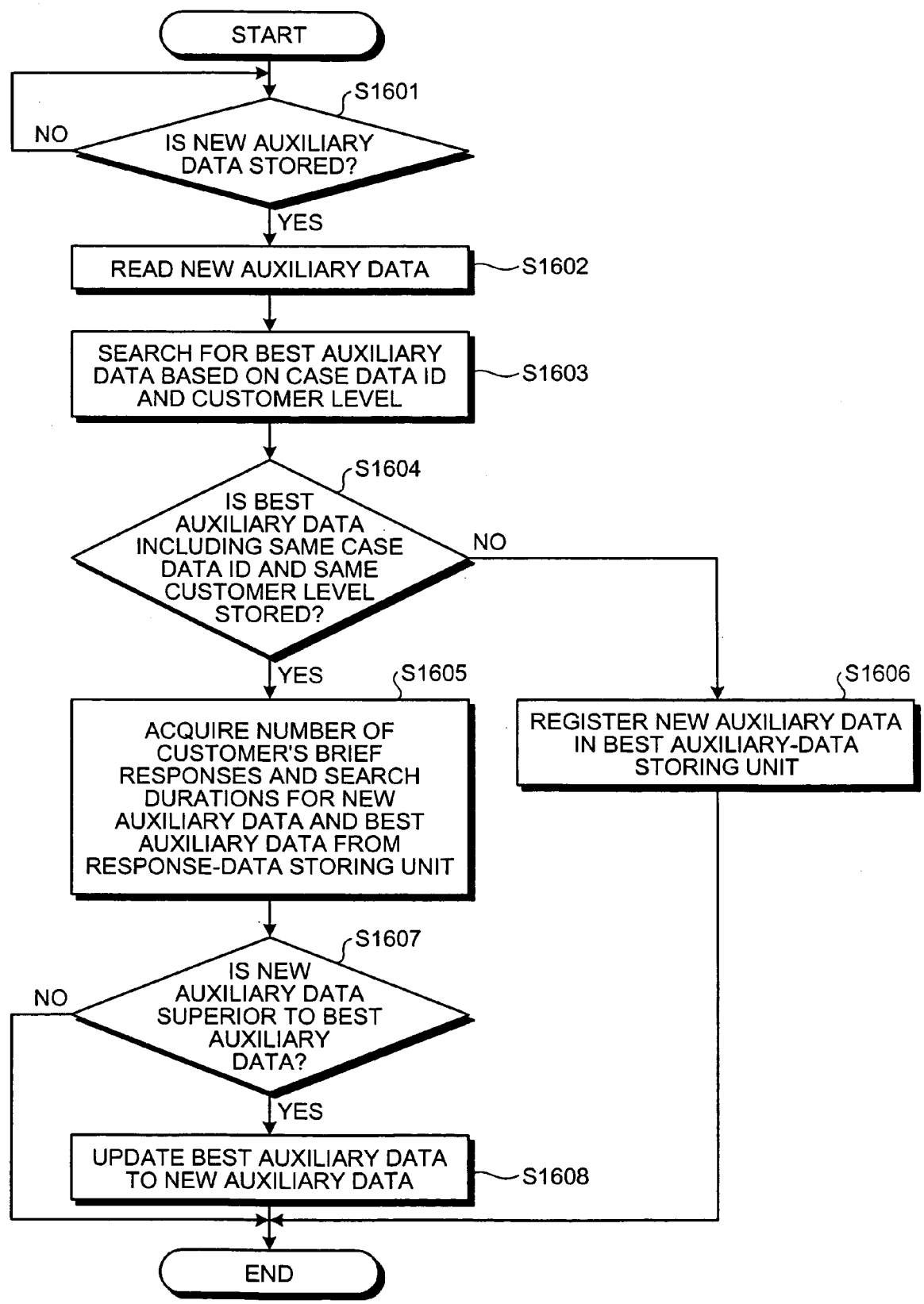
FIG. 16 is a flowchart of a best auxiliary-data registration process performed by a best auxiliary-data registering unit shown in FIG. 15.

FIG. 16 is a flowchart of a best auxiliary-data registration process performed by the auxiliary-data generating apparatus 50. When the new auxiliary data is stored in the auxiliary-data storing unit 37 (Yes at step S1601), the best auxiliary-data registering unit 46 reads the new auxiliary data from the auxiliary-data storing unit 37 (step S1602). The best auxiliary-data registering unit 46 searches the best auxiliary-data storing unit 38 for determining whether the best auxiliary data including the same customer level and the same adopted-case data ID as those of the new auxiliary data is stored in the best auxiliary-data storing unit 38 based on the customer level and the adopted-case data ID included in the new auxiliary data (step S1603). If such best auxiliary data is not stored in the best auxiliary-data storing unit 38 (No at S1604), the best auxiliary-data registering unit 46 registers the new auxiliary data in the best auxiliary-data storing unit 38 as the best auxiliary data (step S1606). The best auxiliary-data registration process is thus finished.

On the other hand, if such best auxiliary data is stored in the best auxiliary-data storing unit 38 (Yes at step S1604), the best auxiliary-data registering unit 46 reads pieces of response data corresponding to the same response data IDs as those of the new auxiliary data and the best auxiliary data from the response-data storing unit 31 based on response data IDs included in the new auxiliary data and the best auxiliary data, respectively. In addition, the best auxiliary-data registering unit 46 acquires the numbers of customer's brief responses and the speech durations corresponding to the response data IDs included in the new auxiliary data and the best auxiliary data, respectively (step S1605). If it is determined that the new auxiliary data is superior to the best auxiliary data by the comparison (Yes at step S1607), the best auxiliary-data registering unit 46 registers the new auxiliary data in the best auxiliary-data storing unit 38 as the best auxiliary data (step S1608). If it is determined that the best auxiliary data is superior to the new auxiliary data (No at step S1607), the best auxiliary-data registration process is finished.

As explained so far, according to the second embodiment, the best auxiliary data with the case data ID and the customer level the same as those of the new auxiliary data is acquired from among the best auxiliary data. Thereafter, it is determined whether the new auxiliary data is superior to the best auxiliary data. If the new auxiliary data is superior to the best auxiliary data, the new auxiliary data is newly registered as the best auxiliary data. Namely, only useful auxiliary data is stored by selecting the auxiliary data. This further facilitates the operator to make an appropriate response according to the customer level.

In the first or second embodiment, the auxiliary-data generating apparatus 10 or 50 that only generates and stores the auxiliary data or the best auxiliary data has been explained. In a third embodiment of the present invention, an operator supporting apparatus 60 that supports the operator by actually using the best auxiliary data generated by the auxiliary-data generating apparatus.

Figure 17:
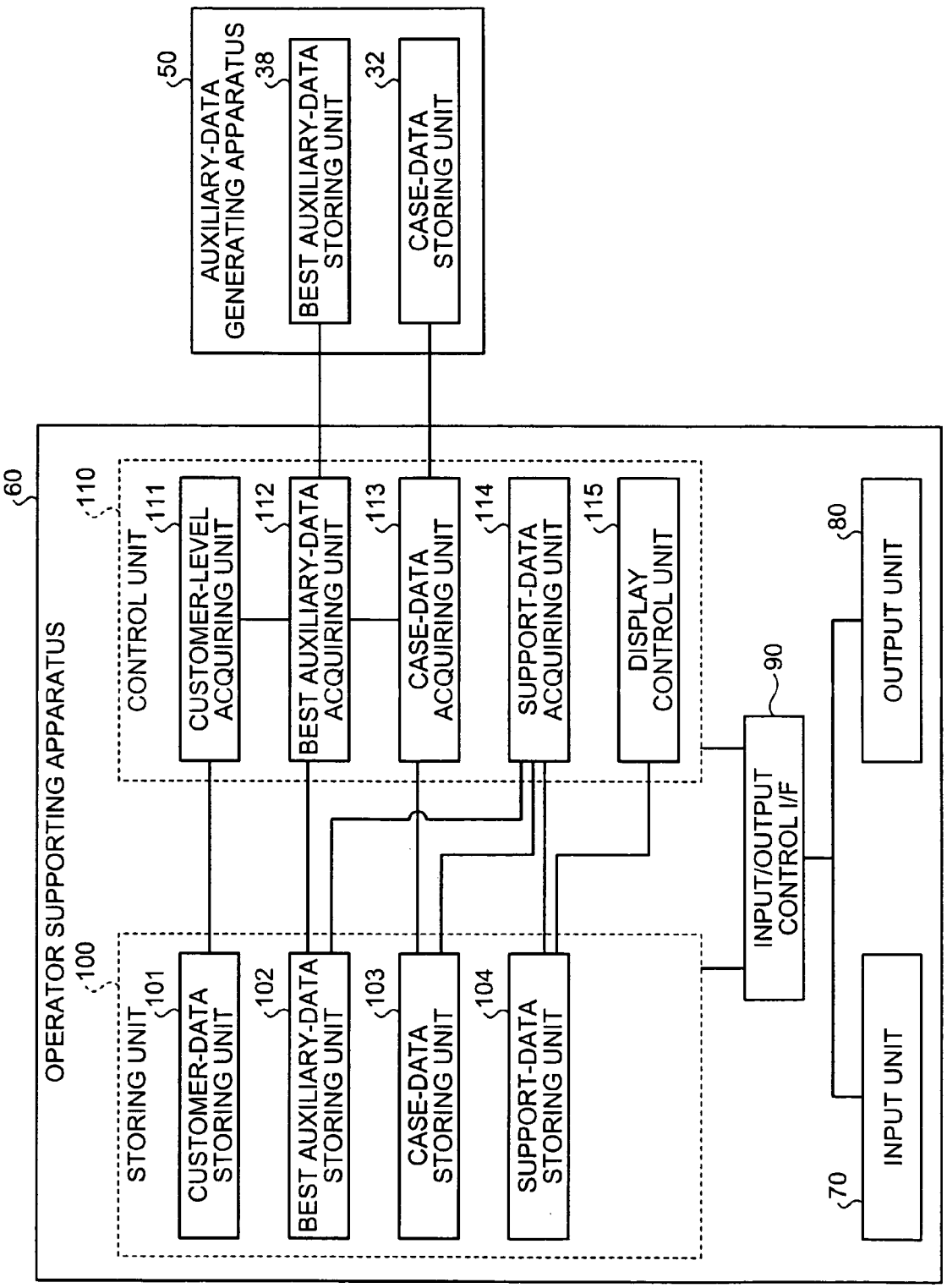
FIG. 17 is a block diagram of an operator support apparatus according to a third embodiment of the present invention.

FIG. 17 is a block diagram of the operator supporting apparatus 60. The operator supporting apparatus 60 includes an input unit 70, an output unit 80, an input/output control interface (I/F) 90, a storing unit 100, and a control unit 110.

The input unit 70 includes a keyboard and a mouse and receives various pieces of information. The input unit 70 receives, for example, a customer ID that is information used in a customer-level acquiring unit 111 of the control unit 110, search keywords used in a case-data acquiring unit 113 of the control unit 110, and the like through the keyboard.

The output unit 80 includes a display and outputs various pieces of information. The output unit 80 displays and outputs, for example, support data output from a display control unit 115 of the control unit 110 to the display.

The input/output control I/F 90 controls data transfer among the input unit 70, the output unit 80, the storing unit 100, and the control unit 110.

The storing unit 100 stores therein data used for various processes performed by the control unit 110. The storing unit 100 includes, particularly as constituent elements of close relevance to the second embodiment, a customer-data storing unit 101, a best auxiliary-data storing unit 102, a case-data storing unit 103, and a support-data storing unit 104.

Figure 19:
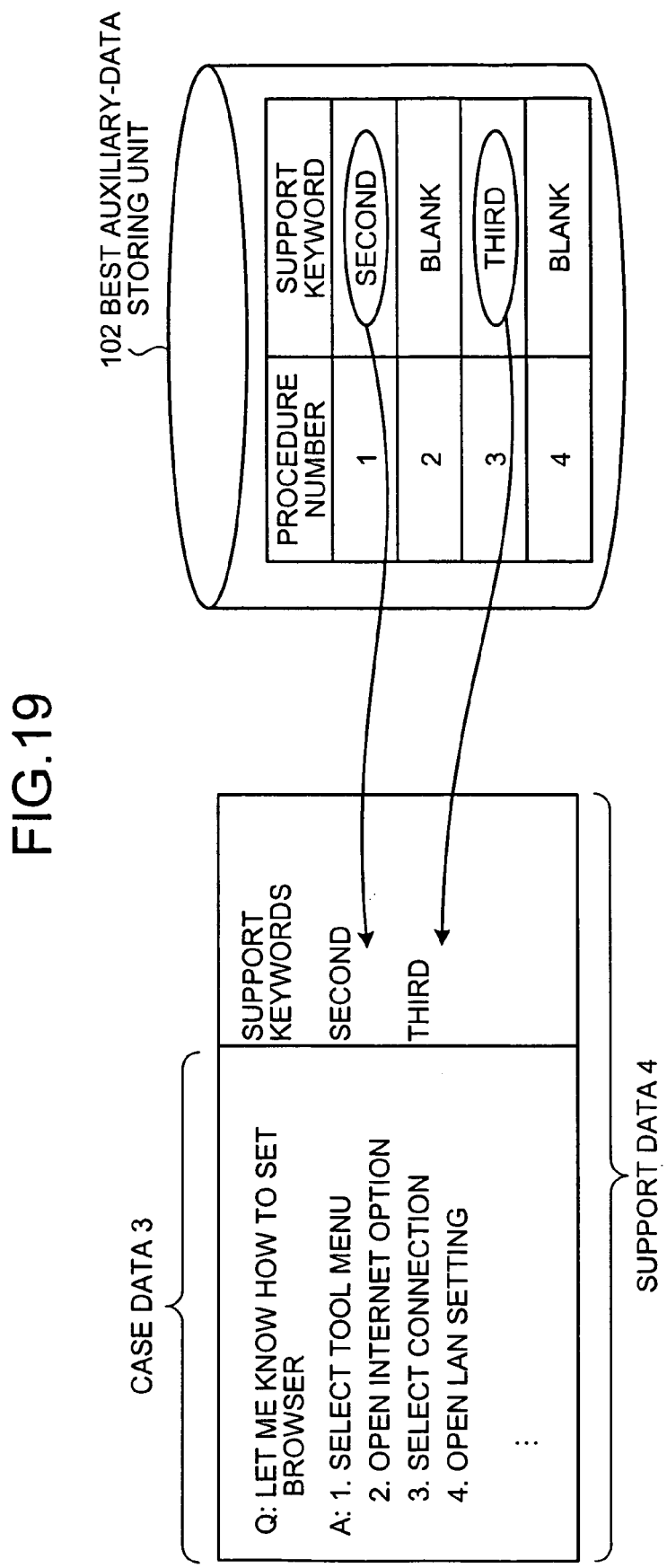
FIG. 19 is an example of support data generated by a support-data generating unit shown in FIG. 17.

The customer-data storing unit 101 stores therein customer data that is information on each customer. Specifically, the customer-data storing unit 101 stores therein a customer ID that is identification information for uniquely identifying each customer while making the customer ID correspond to the customer level of the customer as shown in FIG. 19. The information made to correspond to the customer level can be a combination of, for example, a name, an age, an address, a registration date, and the like of the customer besides the customer ID.

FIG. 18 is an example of information stored in the customer-data storing unit 101. As shown in FIG. 18, the customer-data storing unit 101 stores therein the customer ID "A" while making the customer ID "A" correspond to the customer level "primary".

The best auxiliary-data storing unit 102 stores therein best auxiliary-data acquired by a best-auxiliary data acquiring unit 112 of the control unit 110. Specifically, the best auxiliary-data storing unit 102 stores therein the best auxiliary data similarly to the best auxiliary-data storing unit 38 according to the second embodiment. The best auxiliary data is data in which a response data ID, the customer level, an adopted-case data ID, common keywords, procedure numbers, and a case data ID while making them correspond to one another.

The case-data storing unit 103 stores therein case data acquired by the case-data acquiring unit 113 of the control unit 110. Specifically, the case-data storing unit 103 stores therein case data and the case data ID while making them correspond to each other similarly to the case-data storing unit 32 according to the first embodiment.

The support-data storing unit 104 stores therein support data generated by a support-data generating unit 114 of the control unit 110. Specifically, the support-data storing unit 104 receives the support data from the support-data generating unit 114 and stores therein the received support data.

The control unit 110 controls the operator supporting apparatus 60 to perform various processes. The control unit 110 includes, as constituent elements particularly of close relevance to the second embodiment, the customer-level acquiring unit 111, the best-auxiliary data acquiring unit 112, the case-data acquiring unit 113, the support-data generating unit 114, and the display control unit 115.

The customer-level acquiring unit 111 acquires the customer level indicating the knowledge level of a predetermined customer, on whom the operator actually attends, about the content of the customer's inquiry. Specifically, when receiving the customer ID input by the operator from the input unit 70, the customer-level acquiring unit 111 reads the customer data from the customer-data storing unit 101 based on the customer ID and acquires the customer level of the customer. The customer-level acquiring unit 111 outputs the acquired customer level to the best auxiliary-data acquiring unit 112.

The best auxiliary-data acquiring unit 112 acquires best auxiliary data based on the customer level and the case data ID. Specifically, the best auxiliary-data acquiring unit 112 receives the customer level from the customer-level acquiring unit 111, and receives the case data ID from the case-data acquiring unit 113. If so, the best auxiliary-data acquiring unit 112 acquires the best auxiliary data including the same customer level and the same case data ID as those acquired by the customer-level acquiring unit 111 and the case-data acquiring unit 113 from the best auxiliary-data storing unit 102 based on the customer level and the case data ID. The best auxiliary-data acquiring unit 112 stores the best auxiliary data in the best auxiliary-data storing unit 102.

The case-data acquiring unit 113 acquires case data suitable for the customer's inquiry from the case-data storing unit 103. Specifically, the case-data acquiring unit 113 receives the search keywords input by the operator and related to the customer inquiry from the input unit 70. If so, the case-data acquiring unit 113 searches the case-data storing unit 32 for the case data based on the search keywords, and acquires the case data suited for the client's inquiry as well as the case data ID. The case-data acquiring unit 113 stores the case data and the case data ID in the case-data storing unit 103.

The support-data generating unit 114 generates support data for supporting the operator using the best auxiliary data and the case data. Specifically, when the best auxiliary data is stored in the best auxiliary-data storing unit 102 and the case data is stored in the case-data storing unit 103, the support-data generating unit 114 reads the best auxiliary data and the case data from the best auxiliary-data storing unit 102 and the case-data storing unit 103, respectively. The support-data generating unit 114 generates the support data including the case data based on the procedure numbers and the support keywords included in the best auxiliary data. The support-data generating unit 114 stores the generated support data in the support-data storing unit 104.

As shown in FIG. 19, for example, the support-data generating unit 114 generates support data 4 including case data 3 so as to display the support keywords "second" and "third" as follows. The support keyword "second" made to correspond to the procedure number "1" in the case data 3 included in the best auxiliary data is displayed next to a response sentence "select tool menu" in the procedure number "1". The support keyword "third" made to correspond to the procedure number "3" in the case data 3 included in the best auxiliary data is displayed next to a response sentence "select connection" in the procedure number "3". Procedure number information is dealt with as positional information on support keywords. Alternatively, the procedure number information can be dealt with as information indicating that the procedure is an effective procedure essential to the customer. Namely, features of response sentences in the respective procedures can be classified into three categories. The first feature is that the response sentence is essential to the customer and is to complement the support keywords. The second feature is that the response sentence is essential to the customer but does not need to complement the support keywords. The third feature is that the response sentence is not always essential to the customer. Specific use of the procedure number information will be explained later in a fifth embodiment.

The display control unit 115 outputs the support data generated by the support-data generating unit 114 to the output unit 80 to display the support data on the display. Specifically, when the support data is stored in the support-data storing unit 104, the display control unit 115 reads the support data from the support-data storing unit 104 and outputs the support data to the output unit 80. The support data is thereby displayed on the display.

Figure 20:
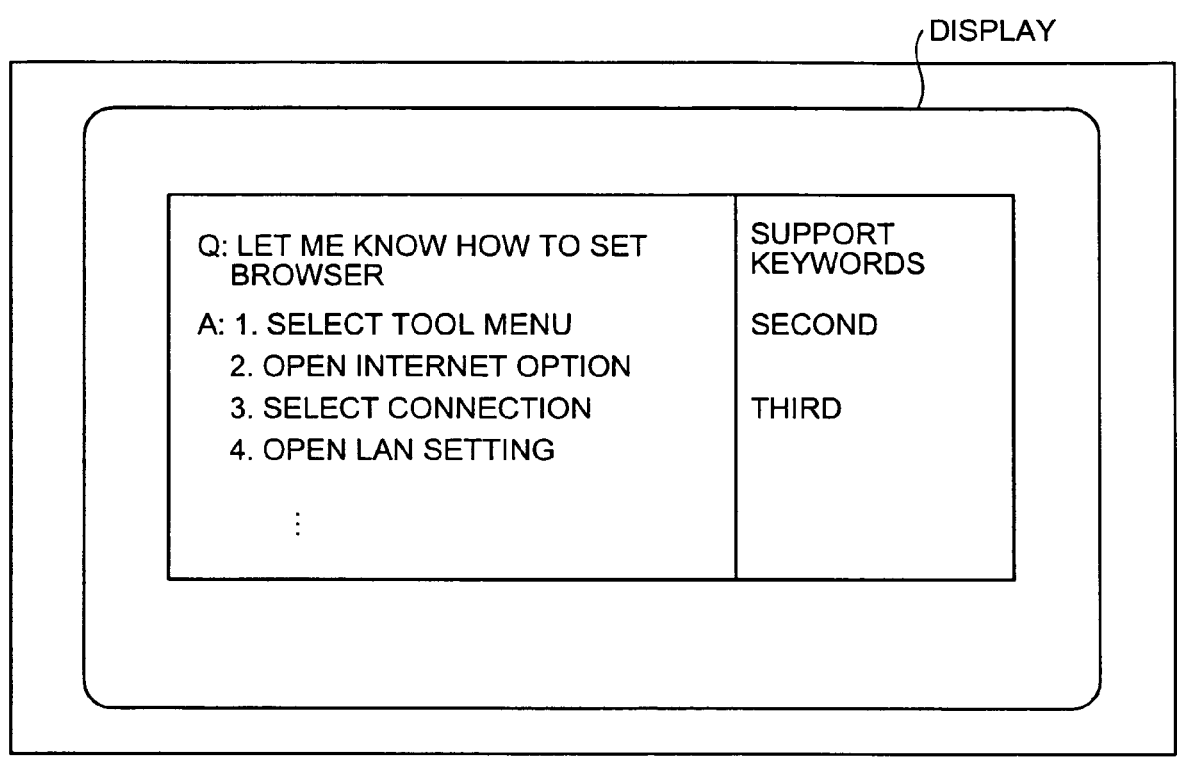
FIG. 20 is an example of the support data displayed on a display of an output unit shown in FIG. 17.

As shown in FIG. 20, for example, the display control unit 115 outputs the support data to the output unit 80 to thereby display the support data on the display.

Figure 21:
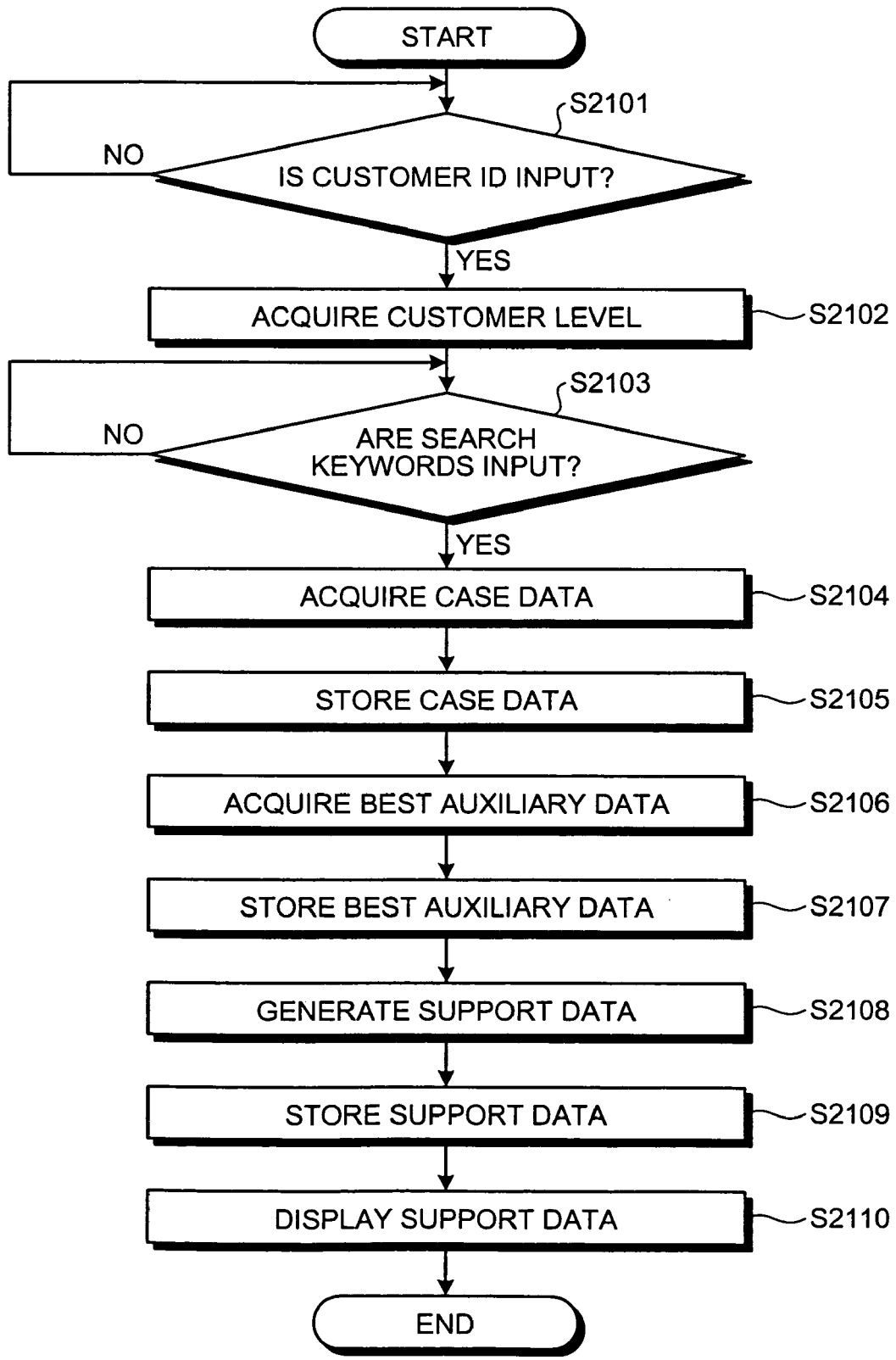
FIG. 21 is a flowchart of an operator support process performed by the operator support apparatus.

FIG. 21 is a flowchart of an operator support process performed by the operator supporting apparatus 60. When the operator inputs the client ID to the input unit 70 (Yes at step S2101), the customer-level acquiring unit 111 receives the customer ID from the input unit 70 and acquires the customer level from the customer-data storing unit 101 (step S2102). The customer-level acquiring unit 111 outputs the acquired customer level to the best auxiliary-data acquiring unit 112.

When the operator inputs search keywords to the input unit 70 (Yes at step S2103), the case-data acquiring unit 113 receives the search keywords from the input unit 70 and acquires the case data ID and the case data from the case-data storing unit 32 based on the search keywords (step S2104). The case-data acquiring unit 113 stores the case data ID and the case data in the case-data storing unit 103 (step S2105). The case-data acquiring unit 113 outputs the acquired case data ID to the best auxiliary-data acquiring unit 112.

The best auxiliary-data acquiring unit 112 acquires the best auxiliary data including the same customer level received from the customer-level acquiring unit 111 and the same case data ID received from the case-data acquiring unit 113 from the best auxiliary-data storing unit 102 based on the customer level received from the customer-level acquiring unit 111 and the case data ID received from the case-data acquiring unit 113 (step S2106). The best auxiliary-data acquiring unit 112 stores the acquired best auxiliary data in the best auxiliary-data storing unit 102 (step S2107).

The support-data generating unit 114 generates the support data using the best auxiliary data read from the best auxiliary-data storing unit 102 and the case data read from the case-data storing unit 103 (step 2108). The support-data generating unit 114 stores the generated support data in the support-data storing unit 104 (step S2109).

Finally, the display control unit 115 outputs the support data read from the support-data storing unit 104 to the output unit 80, thereby displaying the support data on the display (step S2110). The operator support process is thus finished.

As explained so far, according to the third embodiment, the customer level for the customer to whom the operator is responding, and the case data ID of the case data referred to for the customer's inquiry are acquired. The best auxiliary data including the same customer level and the same case data as those for the customer's inquiry is acquired from the best auxiliary-data storing unit. Thereafter, the support data for supporting the operator is generated using the best auxiliary data and the case data. Thus, the operator can make an appropriate response according to the customer level with reference to the support data.

Moreover, in the case data, response sentences each including response keywords are arranged for the respective procedures. After detecting the common keywords with respect to each procedure, the speech keywords, which appear in the same procedure where the common keywords appear and that do not match the response keywords, are extracted as the support keywords. The auxiliary data includes the procedure numbers as well as the case data ID, the customer level, and the support keywords. The support data is generated so that the response sentence in the procedure corresponding to the procedure number included in the best auxiliary data is displayed in association with the support keywords. By allowing the operator to refer to the support data, the operator can make a more appropriate response according to the customer level. Namely, the support data is generated so that the support keywords are associated with the response sentence to be used. This further facilitates the operator to make an appropriate response according to the customer level with reference to the support data.

Furthermore, the customer data is stored, and the customer level of the customer to whom the operator is responding is obtained based on the customer data. Therefore, as compared with the method of acquiring the customer level from the response data, it is possible to ensure acquiring the customer level. The method of acquiring the customer level from the response data will be explained later in the fifth embodiment.

In the third embodiment, the operator supporting apparatus that supports the operator by using the best auxiliary data for the case data has been explained. In a fourth embodiment of the present invention, a skill determining apparatus that determines operator's skill by using the best auxiliary data for the case data will be explained.

Figure 22:
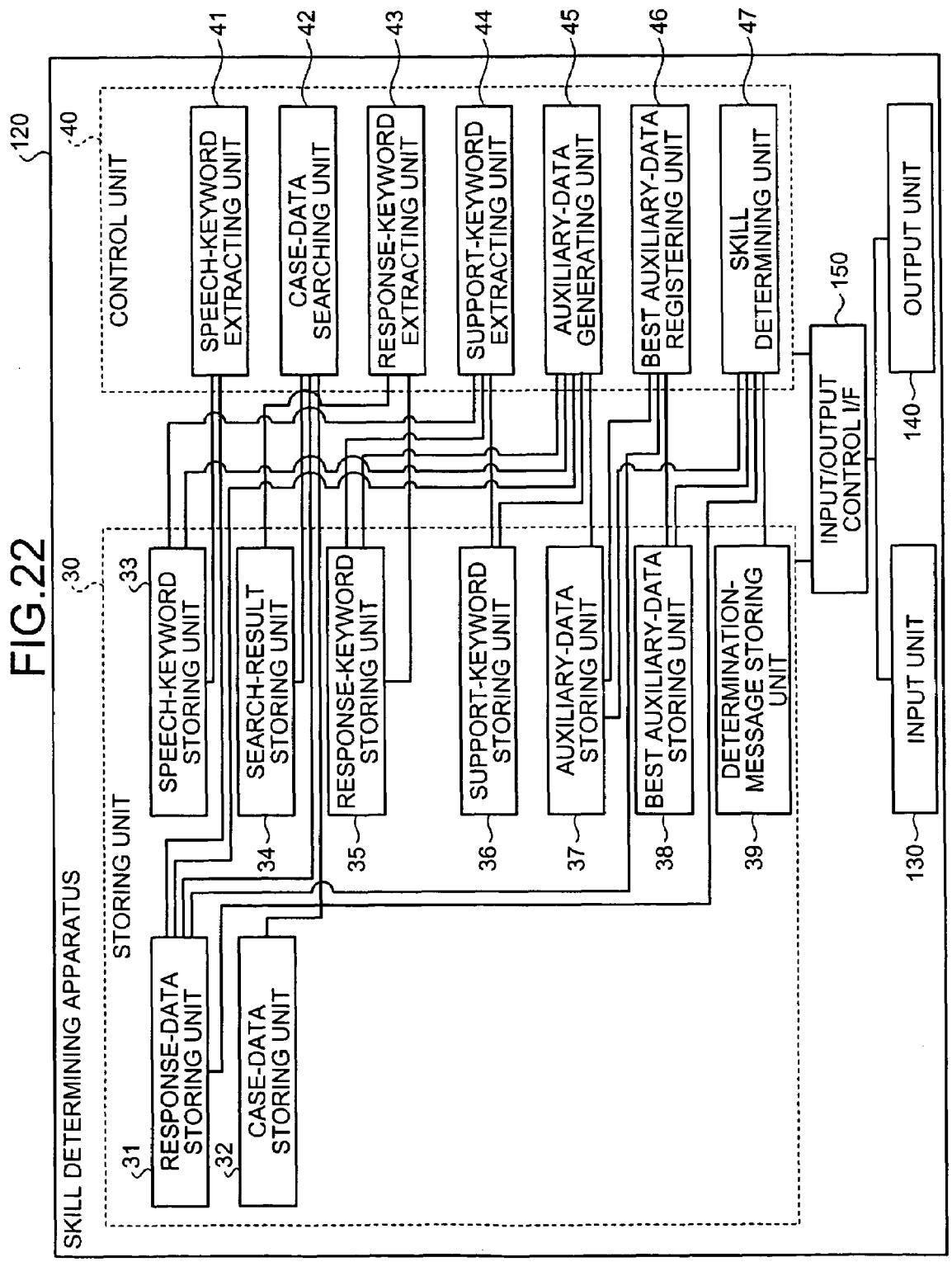
FIG. 22 is a block diagram of a skill determining apparatus according to a fourth embodiment of the present invention.

FIG. 22 is a block diagram of a skill determining apparatus 120. The skill determining apparatus 120 includes an input unit 130, an output unit 140, an input/output control I/F 150, the storing unit 30, and the control unit 40. Constituent elements that operate similarly to those according to the first or second embodiment are denoted by the same reference symbols, respectively and will not be repeatedly explained herein. Namely, only a determination-message storing unit 39 and a skill determining unit 47 will be explained.

The determination-message storing unit 39 stores therein a correspondence table for the correspondence between a determination result obtained by causing the skill determining unit 47 to determine operator's skill and a message. Specifically, the determination-message storing unit 39 compares the determination-target auxiliary data and the best auxiliary data based on the procedure numbers and the support keywords included in each of the auxiliary data and the best auxiliary data. Nine determination results and nine messages corresponding to the respective determination results as well as a determination result if the determination-target auxiliary data is superior to the best auxiliary data and a message corresponding to the determination result are stored as shown in FIG. 23. The nine determination results are a combination of three determination results, i.e., the number of procedures used for explanation of the determination-target auxiliary data is larger than, smaller than, and equal to that of the best auxiliary data, and three determination results, i.e., the number of support keywords of the determination-target auxiliary data is larger than, smaller than, and equal to that of the best auxiliary data.

That is, as shown in FIG. 23, for example, the determination-message storing unit 39 stores therein the determination result and the corresponding message "explanation appears quite redundant" while making them correspond to each other. The determination result indicates that the number of procedures used for explanation of the determination-target auxiliary data is larger than that of the best auxiliary data. The determination result also indicates that the number of support keywords of the determination-target auxiliary data is larger than that of the best auxiliary data.

The skill determining unit 47 acquires the best auxiliary data equal in the case ID and the customer level to the new auxiliary data from pieces of best auxiliary data. Thereafter, the skill determining unit 47 compares the new auxiliary data with the best auxiliary data and calculates the operator's skill related to the new auxiliary data.

Specifically, when the new auxiliary data is stored in the auxiliary-data storing unit 37, the skill determining unit 47 reads the new auxiliary data from the auxiliary-data storing unit 37, and reads the best auxiliary data, which is equal in the case ID, the response ID, and the case data ID to the new auxiliary data, from the best auxiliary-data storing unit 38. The skill determining unit 47 reads two pieces of response data equal in response data ID to the new auxiliary data and the best auxiliary data, respectively from the response-data storing unit 31 based on the response data IDs included in the new auxiliary data and the best auxiliary data. The skill determining unit 47 also acquires the numbers of customer's brief responses and the speech durations corresponding to the new auxiliary data and the best auxiliary data, respectively, and compares them with each other. By so comparing, the skill determining unit 47 determines which is superior, the new auxiliary data or the best auxiliary data. If determining that the new auxiliary data is superior, then the skill determining unit 47 reads the message corresponding to the determination result from the determination-message storing unit 39 and outputs the read message to the output unit 140 to display the message on the display.

If determining that the new auxiliary data is not superior to the best auxiliary data, the skill determining unit 47 makes nine determinations based on the procedure numbers and the support keywords of both the new auxiliary data and the best auxiliary data. The skill determining unit 47 reads the messages corresponding to the respective determination results from the determination-message storing unit 39. After that, the skill determining unit 47 outputs the messages to the output unit 140 to display the message on the display.

Figure 24:
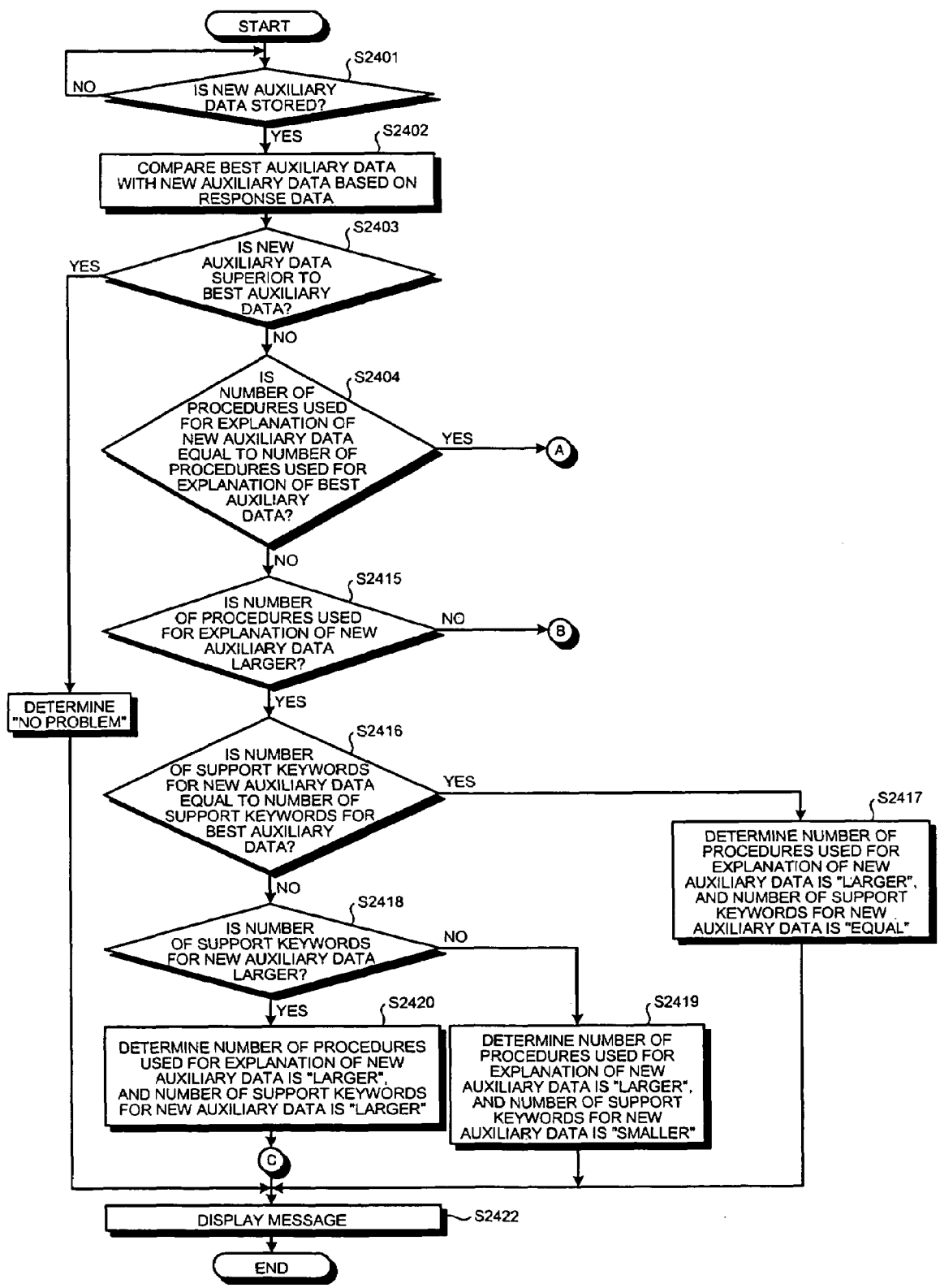
FIGS. 24 to 26 are flowcharts of a skill determination process performed by the skill determining apparatus.
Figure 25:
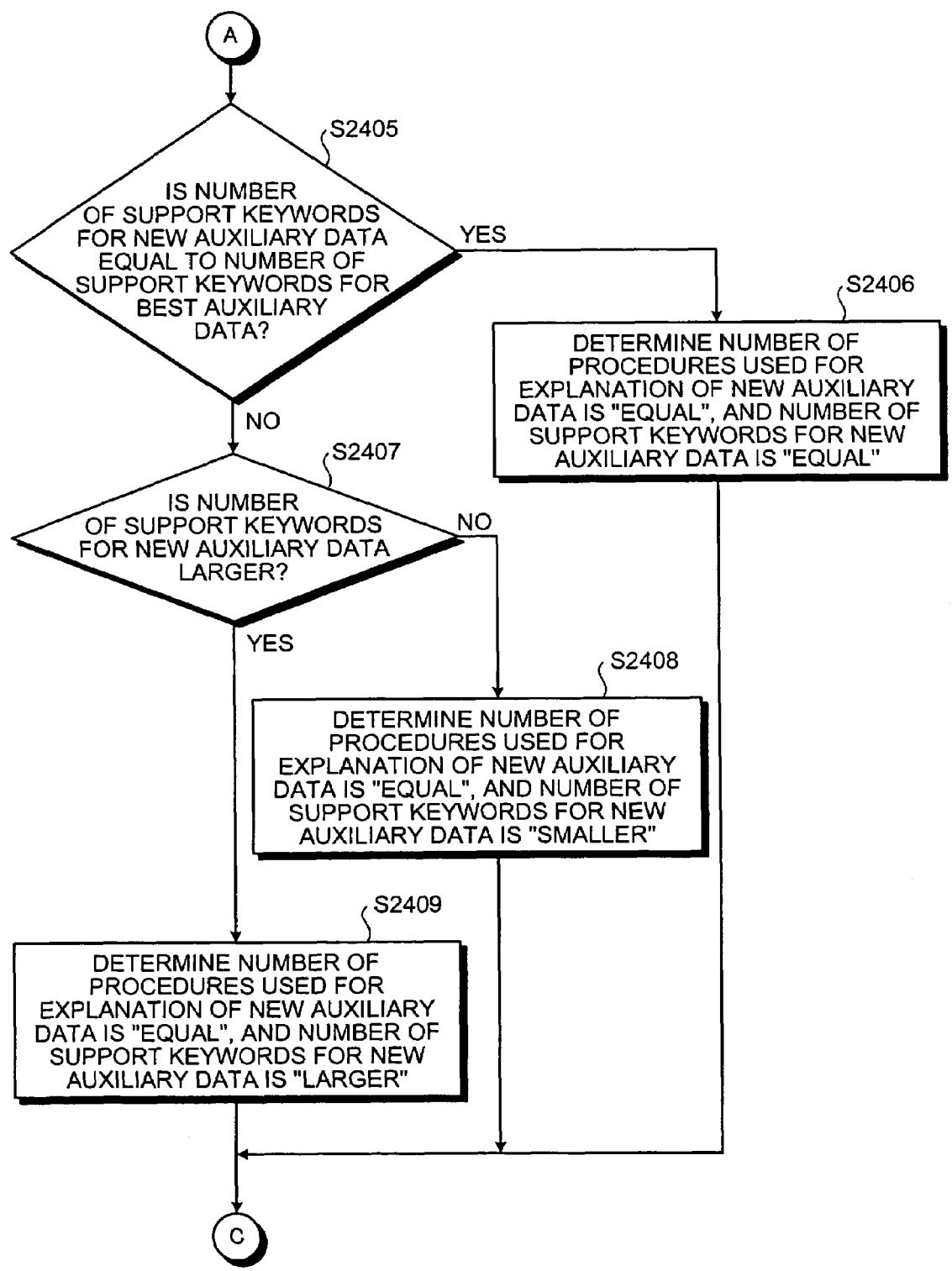
Figure 26:
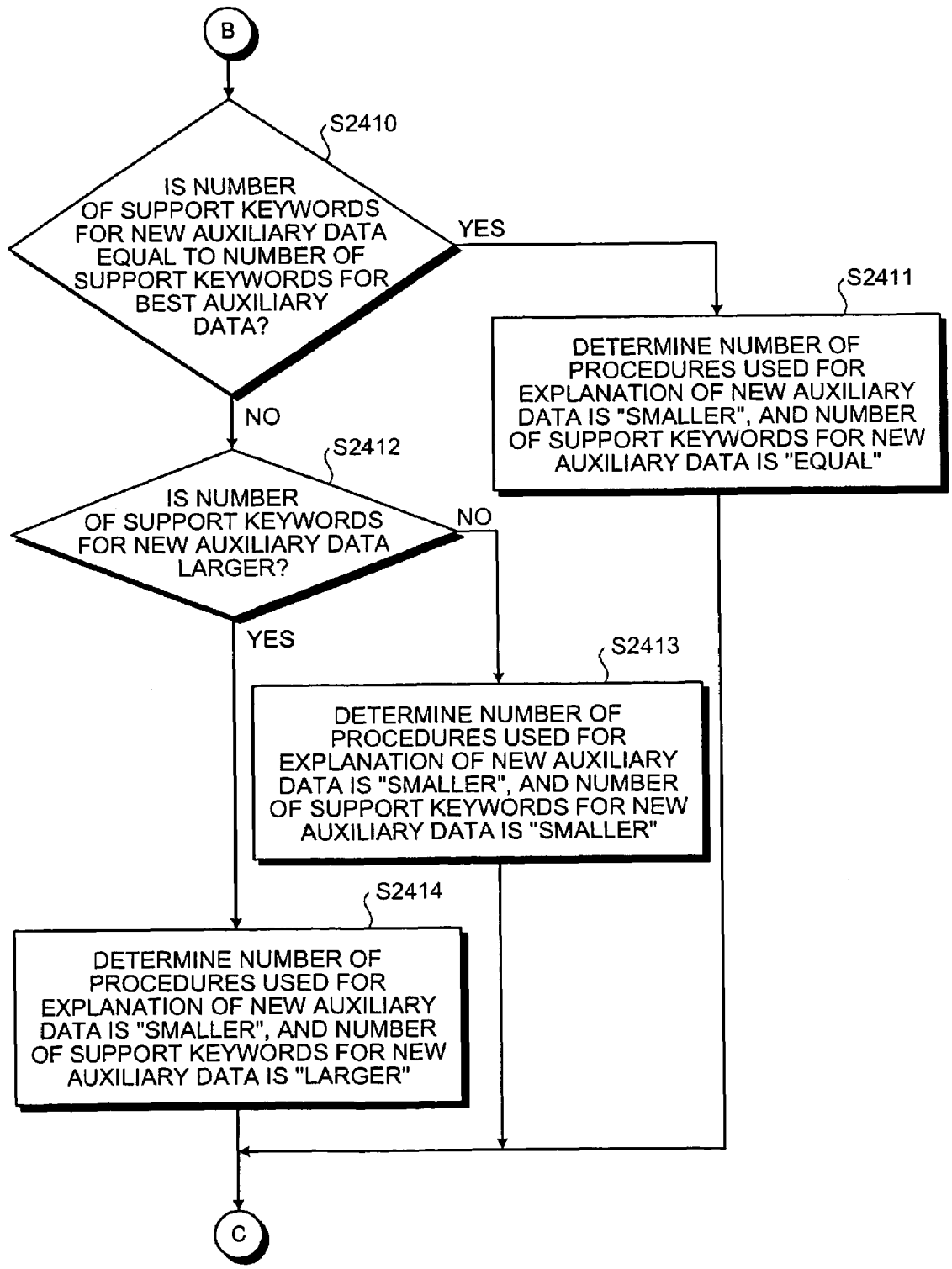

FIGS. 24 to 26 are flowcharts of a skill determination process performed by the skill determining apparatus 120.

When the new auxiliary data is stored in the auxiliary-data storing unit 37 (Yes at step S2401), the skill determining unit 47 compares the new auxiliary data with the best auxiliary data based on the two pieces of response data corresponding to the response data IDs included in the new auxiliary data and the best auxiliary data, respectively (step S2402). If the new auxiliary data is superior to the best auxiliary data (Yes at step S2403), then the skill determining unit 47 determines "no problem", and outputs the determination result to the output unit 140 to display the message corresponding to the determination result on the display (step S2422).

If the new auxiliary data is not superior to the best auxiliary data (No at step S2403), the skill determining unit 47 determines whether the number of procedures used for explanation of the new auxiliary data is equal to the number of procedures used for the best auxiliary data based on the procedures numbers included in the new auxiliary data and the best auxiliary data, respectively (step S2404). If the number of procedures used for explanation of the new auxiliary data is equal to that of the best auxiliary data (Yes at step S2404), the skill determining unit 47 then determines whether the number of support keywords included in the new auxiliary data is equal to that included in the best auxiliary data based on the support keywords included in the new auxiliary data and the best auxiliary data (step S2405).

If the number of support keywords included in the new auxiliary data is equal to that included in the best auxiliary data (Yes at step S2405), the skill determining unit 47 determines that the number of support keywords included in the new auxiliary data is equal to that included in the best auxiliary data (step S2406). The skill determining unit 47 outputs the determination result to and outputs the determination result to the output unit 140 to display the message corresponding to the determination result on the display (step S2422).

If the number of support keywords included in the new auxiliary data is not equal to that included in the best auxiliary data (No at step S2405), the skill determining unit 47 further determines whether the number of support keywords included in the new auxiliary data is larger than that included in the best auxiliary data (step S2407). If the number of support keywords included in the new auxiliary data is larger than that included in the best auxiliary data (Yes at step S2407), the skill determining unit 47 determines that the number of procedures used for explanation of the new auxiliary data is equal to that of the best auxiliary data and the number of support keywords included in the new auxiliary data is larger than that included in the best auxiliary data (step S2409). The skill determining unit 47 outputs the determination result to the output unit 140 to display the message corresponding to the determination result on the display (step S2422).

The process returns to the procedure of determining whether the number of procedures used for explanation of the new auxiliary data is equal to that of the best auxiliary data based on the procedure numbers included in the new auxiliary data and the best auxiliary data, respectively (step S2404). If the number of procedures used for explanation of the new auxiliary data is not equal to that of the best auxiliary data (No at step S2404), the skill determining unit 47 further determines whether the number of procedures used for explanation of the new auxiliary data is larger that used for explanation of the best auxiliary data (step S2415). If the number of procedures used for explanation of the new auxiliary data is smaller than that of the best auxiliary data (No at step S2415), the skill determining unit 47 further determines whether the number of support keywords included in the new auxiliary data is equal to the number of support keywords included in the best auxiliary data (step S2410).

If the number of support keywords included in the new auxiliary data is equal to the number of support keywords included in the best auxiliary data (Yes at step S2410), the skill determining unit 47 determines that the number of procedures used for explanation of the new auxiliary data is smaller than that of the best auxiliary data and that the number of support keywords included in the new auxiliary data is equal to that included in the best auxiliary data (step S2411). The skill determining unit 47 outputs the determination result to the output unit 140 to display the message corresponding to the determination result on the display (step S2422).

If the number of support keywords included in the new auxiliary data is not equal to the number of support keywords included in the best auxiliary data (No at step S2410), the skill determining unit 47 further determines whether the number of support keywords included in the new auxiliary data is larger than the number of support keywords included in the best auxiliary data (step S2412). If the number of support keywords included in the new auxiliary data is larger than the number of support keywords included in the best auxiliary data (Yes at step S2412), the skill determining unit 47 determines that the number of procedures used for explanation of the new auxiliary data is smaller than that of the best auxiliary data and that the number of support keywords included in the new auxiliary data is larger that included in the best auxiliary data (step S2414). The skill determining unit 47 outputs the determination result to the output unit 140 to display the message corresponding to the determination result on the display (step S2422). If the number of support keywords included in the new auxiliary data is smaller than the number of support keywords included in the best auxiliary data (No at step S2412), the skill determining unit 47 determines that the number of procedures used for explanation of the new auxiliary data is smaller than that of the best auxiliary data and that the number of support keywords included in the new auxiliary data is smaller that included in the best auxiliary data (step S2413). The skill determining unit 47 outputs the determination result to the output unit 140 to display the message corresponding to the determination result on the display (step S2422).

The process returns to the procedure of determining whether the number of procedures used for explanation of the new auxiliary data is larger than that of the best auxiliary data based on the procedure numbers included in the new auxiliary data and the best auxiliary data, respectively (step S2415). If the number of procedures used for explanation of the new auxiliary data is larger than that of the best auxiliary data (Yes at step S2415), the skill determining unit 47 further determines whether the number of support keywords for the new auxiliary data is equal to that for the best auxiliary data (step S2416).

If the number of support keywords included in the new auxiliary data is equal to the number of support keywords included in the best auxiliary data (Yes at step S2416), the skill determining unit 47 the skill determining unit 47 determines that the number of procedures used for explanation of the new auxiliary data is larger than that of the best auxiliary data and that the number of support keywords included in the new auxiliary data is equal to that included in the best auxiliary data (step S2417). The skill determining unit 47 outputs the determination result to the output unit 140 to display the message corresponding to the determination result on the display (step S2422).

If the number of support keywords included in the new auxiliary data is not equal to the number of support keywords included in the best auxiliary data (No at step S2416), the skill determining unit 47 further determines whether the number of support keywords included in the new auxiliary data is larger than the number of support keywords included in the best auxiliary data (step S2418). If the number of support keywords included in the new auxiliary data is larger than the number of support keywords included in the best auxiliary data (Yes at step S2418), the skill determining unit 47 determines that the number of procedures used for explanation of the new auxiliary data is larger than that used for explanation of the best auxiliary data and that the number of support keywords included in the new auxiliary data is larger that included in the best auxiliary data (step S2420). The skill determining unit 47 outputs the determination result to the output unit 140 to display the message corresponding to the determination result on the display (step S2422). If the number of support keywords included in the new auxiliary data is smaller than the number of support keywords included in the best auxiliary data (No at step S2418), the skill determining unit 47 determines that the number of procedures used for explanation of the new auxiliary data is larger than that of the best auxiliary data and that the number of support keywords included in the new auxiliary data is smaller that included in the best auxiliary data (step S2418). The skill determining unit 47 outputs the determination result to the output unit 140 to display the message corresponding to the determination result on the display (step S2422).

As explained so far, according to the fourth embodiment, the best auxiliary data with the case data ID and the customer level the same as those of the new auxiliary data is acquired from stored best auxiliary data. The new auxiliary data is compared with the acquired auxiliary data, and the operator's skill related to the new auxiliary data is calculated. Namely, by comparing, for example, the number of support keywords included in the best auxiliary data with the number of support keywords included in the new auxiliary data, it can be determined whether the explanation is redundant. It is thereby possible to easily determine the operator's skill.

The first to fourth embodiments of the present invention have been explained so far. However, the present invention can be carried out by various different embodiments from the first to fourth embodiments. The different embodiments will now be explained with respect to the following (1) to (8) items.

(1) Response Data

In the first to fourth embodiments, the voice data has been explained as the example of the response data. However, the present invention is not limited to the first to fourth embodiments. Alternatively, text data on the dialog between the operator and the customer can be used as the response data. In this case, the speech-keyword extracting unit 41 can extract speech keywords by analyzing the text data by the morphological analysis technique or the like. Furthermore, the speech-keyword extracting unit 41 can extract, as information indicating the relative positional relationship between among the speech keywords in the text data, i.e., response data, the number of bytes from the top of the sentence as well as the speech keywords.

(2) Case Data

In the first to fourth embodiments, the response sentences arranged in the respective procedures have been explained as the example of the case data. However, the present invention is not limited to the first to fourth embodiments. Alternatively, one response sentence can be used as the case data. In this case, the response-keyword extracting unit 43 can extract, for example, the number of bytes from the top of the sentence as well as response keywords. The support-data generating unit 114 can generate the support data based on the number of bytes so as to display each support keywords next to a line of the response sentence on which the common keyword appears.

(3) Best Determination

In the second embodiment, it is determined which is superior, the new auxiliary data or the best auxiliary data based on the numbers of customer's brief responses and the speech durations acquired from the customer speech data included in the response data. However, the present invention is not limited to the second embodiment. For example, scores obtained by causing the customer to actually determine the operator's response can be included in the response data. Furthermore, it can be determined which is superior, the new auxiliary data or the best auxiliary data based on the scores. Namely, it suffices that it can be determined which is superior, the new auxiliary data or the best auxiliary data by some method.

(4) Display of Response Sentence

In the third embodiment, the example of dealing with the information on procedure numbers only as the positional information on the support keywords has been explained. However, the present invention is not limited to the third embodiment. Alternatively, the information on procedure numbers can be dealt with not only as the positional information on the support keywords but also as information indicating whether each procedure is an effective procedure essential to the customer. Specifically, the response sentence in the effective procedure is displayed differently from those in the other procedures of the case data based on the information on procedure numbers. Namely, the support-data generating unit 114 generates the support data so as to display the response sentences in the procedure numbers included in the new auxiliary data by using a different color or a different font size from those for the response sentences in the other procedure numbers, or to display only the response sentences in the procedure numbers included in the new auxiliary data.

By doing so, the support data is generated such that the response sentences effective when the operator responds to the customer's inquiry is conspicuously displayed. It is, therefore, possible to easily realize an accurate response of the operator according to the customer level.

(5) Acquisition of Customer Level

In the third embodiment, to acquire the customer level, the operator actually asks the customer to let the operator know the customer ID, and inputs the customer ID using the keyboard. The customer-level acquiring unit 111 acquires the customer level from the customer-data storing unit 101 based on the customer ID. However, the present invention is not limited to the third embodiment. Alternatively, the dialog between the customer and the operator, for example, can be analyzed by the voice recognition technique or the like. If many technical terms are extracted from the customer's speech, the customer level can be set as higher level.

By doing so, the customer level of even an unregistered customer can be acquired differently from the method of acquiring the customer level by storing attribute information on the customer.

(6) Skill Determination

In the fourth embodiment, the operator's skill is determined based on the number of procedures used for the explanation and the number of support keywords. However, the present invention is not limited to the fourth embodiment. It suffices that the operator skill can be determined based at least on the number of support keywords.

(7) System Configuration and the Like

The constituent elements of the auxiliary-data generating apparatus 10, the auxiliary-data generating apparatus 50, the operator supporting apparatus 60, and the skill determining apparatus 120 according to the first to fourth embodiments, respectively are only functionally conceptual and are not always required to be physically constituted as shown in the drawings. Namely, the specific form of distribution or integration of each of the auxiliary-data generating apparatus 10, the auxiliary-data generating apparatus 50, the operator supporting apparatus 60, and the skill determining apparatus 120 is not limited to that shown in the drawings. For example, the case-data searching unit 42 and the response-keyword extracting unit 43 can be integrated with each other. That is, desired numbers of all of or part of the constituent elements can be appropriately distributed or integrated either functionally or physically according to various loads, utilization status or the like. Further, all of or part of the processing functions of each of the auxiliary-data generating apparatus 10, the auxiliary-data generating apparatus 50, the operator supporting apparatus 60, and the skill determining apparatus 120 can be either realized by a central processing unit (CPU) and programs analyzed and executed by the CPU or realized as hardware based on wired logic.

Moreover, information including the processing procedures, the control procedures, the specific names, various pieces of data, parameters can be changed as desired unless specified otherwise. For example, in the operator support process, the acquisition of the customer level and the acquisition of the case data can be performed in reverse order.

(8) Operator Supporting Programs

Figure 27:
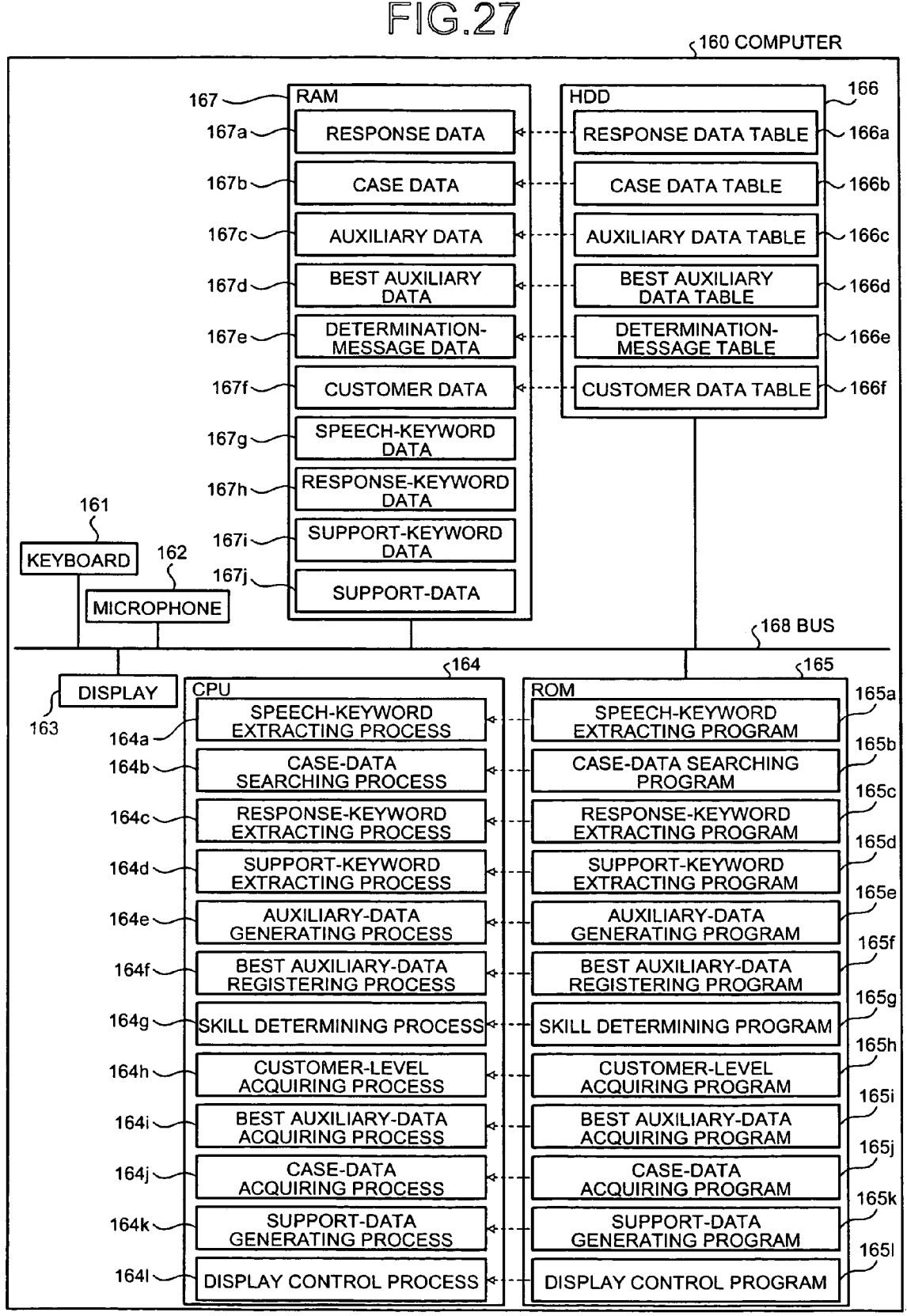
FIG. 27 is a block diagram of a computer that executes an operator support program according to a fifth embodiment of the present invention.

In the first to fourth embodiments, various processes are realized by hardware logic; however, the present invention is not so limited, and the processes can be realized by software. In other words, computer programs (hereinafter, "operator supporting programs") can be executed on a computer to realize the same function as the auxiliary-data generating apparatus 10, the auxiliary-data generating apparatus 50, the operator supporting apparatus 60, and the skill determining apparatus 120. Such a computer will be explained below. FIG. 27 is a block diagram of a computer 160 that executes the operator supporting programs.

The computer 160 includes a keyboard 161, a microphone 162, a display 163, a CPU 164, a read-only memory (ROM) 165, a hard disk drive (HDD) 166, a random-access memory (RAM) 167, and the like which are connected to one another by a bus 168 or the like.

The ROM 165 stores therein the operator support programs that realize the same function as the auxiliary-data generating apparatus 10, the auxiliary-data generating apparatus 50, the operator supporting apparatus 60, and the skill determining apparatus 120 according to the first to fourth embodiments in advance. Specifically, as shown in FIG. 27, the operator support programs include a speech-keyword extracting program 165a, a case-data searching program 165b, a response-keyword extracting program 165c, a support-keyword extracting program 165d, an auxiliary-data generating program 165e, a best auxiliary-data registering program 165f, a skill determining program 165g, a customer-level acquiring program 165h, a best auxiliary-data acquiring program 165i, a case-data acquiring program 165j, a support-data generating program 165k, and a display control program 165l. The programs 165a to 165l can be appropriately integrated or distributed similarly to the constituent elements of the auxiliary-data generating apparatus 10, the auxiliary-data generating apparatus 50, the operator supporting apparatus 60, and the skill determining apparatus 120 shown in FIGS. 2, 15, 17, and 22, respectively.

The CPU 164 reads and executes the programs 165a to 165l from the ROM 165. By doing so, as shown in FIG. 27, the programs 165a to 165l function as a speech-keyword extracting process 164a, a case-data searching process 164b, a response-keyword extracting process 164c, a support-keyword extracting process 164d, an auxiliary-data generating process 164e, a best auxiliary-data registering process 164f, a skill determining process 164g, a customer-level acquiring process 164h, a best auxiliary-data acquiring process 164i, a case-data acquiring process 164j, a support-data generating process 164k, and a display control process 164l, respectively. It is to be noted that the processes 164a to 164l correspond to the speech-keyword extracting unit 41, the case-data searching unit 42, the response-keyword extracting unit 43, the support-keyword extracting unit 44, the auxiliary-data generating unit 45, the best auxiliary-data registering unit 46, the skill determining unit 47, the customer-level acquiring unit 111, the best auxiliary-data acquiring unit 112, the case-data acquiring unit 113, the support-data generating unit 114, and the display control unit 115 shown in FIG. 2, 15, 17, or 22, respectively.

As shown in FIG. 27, the HDD 166 includes a response data table 166a, a case data table 166b, an auxiliary data table 166c, a best auxiliary-data table 166d, a determination message table 166e, and a customer data table 166f. It is to be noted that the response data table 166a, the case data table 166b, the auxiliary data table 166c, the best auxiliary-data table 166d, the determination message table 166e, and the customer data table 166f correspond to the response-data storing unit 31, the case-data storing unit 32, the auxiliary-data storing unit 37, the best auxiliary-data storing unit 38, the determination message storing unit 39, and the customer-data storing unit 101 shown in FIG. 2, 15, 17, or 22, respectively.

The CPU 164 reads response data 167a, case data 167b, auxiliary data 167c, best auxiliary data 167d, determination-message data 167e, and customer data 167f from the response data table 166a, the case data table 166b, the auxiliary data table 166c, the best auxiliary-data table 166d, the determination message table 166e, and the customer data table 166f, respectively. The CPU 164 stores the read data 167a to 167f in the RAM 167. Further, the CPU 164 executes generation of auxiliary data, generation of support data, skill determination, and the like based on the response data 167a, the case data 167b, auxiliary data 167c, the best auxiliary data 167d, determination-message data 167e, and the customer data 167f as well as speech-keyword data 167g, response-keyword data 167h, support-keyword data 167i, and support data 167j.

The programs 165a to 165l are not necessarily stored in the ROM 165 in advance. Alternatively, the programs 165a to 165l can be stored in, for example, a portable physical medium such as a flexible disk (FD), a CD-ROM, a magneto optical disk (MO) disk, a DVD disk or an IC card inserted into the computer 160, a fixed physical medium such as a HDD provided inside or outside of the computer 160, the other computer (or server) connected to the computer 160 through a public line, the Internet, a local area network (LAN), a wide area network (WAN) or the like. Furthermore, the computer 160 can execute the programs 165a to 165l by reading them from the portable physical medium, the fixed physical medium, the other computer (or server) or the like.

As explained so far, according to the embodiments of the present invention, it is possible to easily realize an appropriate response from an operator according to the customer level. In addition, it is possible to easily realize an accurate determination of the skill of the operator.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for supporting an operator who responds to an inquiry from a customer while referring to case data, the computer program causing a computer to perform:
   extracting words of the operator as speech keywords from response data on a record of contents that the operator has spoken in response to an inquiry from a customer while referring to case data;
   extracting response keywords from the case data corresponding to a response to the inquiry;
   detecting a common keyword in the speech and response keywords by matching the speech keywords with the response keywords;
   extracting a support keyword from the speech keywords that appears in the response data at a time near appearance of the common keyword and that does not match the response keywords; and
   generating auxiliary data that includes case identification information uniquely identifying the case data, a customer level indicating a knowledge level of the customer about the inquiry, and the support keyword.

2. The computer-readable recording medium according to claim 1, further causing the computer to perform:
   storing best auxiliary data selected from a plurality of auxiliary data with identical case identification information and an equal customer level;
   detecting the best auxiliary data with the case identification information and the customer level identical to those of new auxiliary data;
   determining whether the new auxiliary data is superior to the best auxiliary data; and
   storing the new auxiliary data as the best auxiliary data when the new auxiliary data is superior to the best auxiliary data.

3. The computer-readable recording medium according to claim 2, further causing the computer to perform:
   acquiring the customer level of the customer to whom the operator is responding;
   acquiring. the case identification information on the case data which is referred to with respect to the inquiry;
   acquiring the best auxiliary data including acquired customer level and acquired case identification information; and
   generating support data for supporting the operator based on the best auxiliary data and the case data.

4. The computer-readable recording medium according to claim 3, wherein
   the case data includes a plurality of response sentences each including the response keyword, the response sentences being arranged according to a plurality of procedures,
   the detecting a common keyword includes detecting the common keyword with respect to each of the procedures;
   the extracting a support keyword includes extracting the support keyword from the speech keywords that appears in a procedure where the common keyword appears and that does not match the response keywords,
   the auxiliary data further includes support-procedure identification information that uniquely identifies the procedure where the support keyword appears, and
   a response sentence in a procedure identified by the support-procedure identification information contained in the best auxiliary data is displayed in association with the support keyword.

5. The computer-readable recording medium according to claim 4, wherein
   the generating auxiliary data includes generating the auxiliary data that further includes effective-procedure identification information uniquely identifying a procedure where the common keyword has been detected and indicating that the procedure is effective in the case data, and
   the generating support data includes generating the support data so that a response sentence in a procedure identified by the effective-procedure identification information contained in the best auxiliary data is displayed differently from response sentences in other procedures.

6. The computer-readable recording medium according to claim 3, wherein the acquiring the customer level includes obtaining the customer level based on the response data.

7. The computer-readable recording medium according to claim 5, further causing the computer to perform storing customer-attribute information that indicates an attribute of the customer, wherein
   the acquiring the customer level includes obtaining the customer level based on the customer-attribute information.

8. The computer-readable recording medium according to claim 1, further causing the computer to perform:
   storing best auxiliary data selected from a plurality of auxiliary data with identical case identification information and an equal customer level; and
   detecting the best auxiliary data with the case identification information and the customer level identical to those of new auxiliary data;
   comparing the new auxiliary data with the best auxiliary data to calculate a skill of the operator related to the new auxiliary data.

9. An operator supporting apparatus that supports an operator who responds to an inquiry from a customer while referring to case data, the operator supporting apparatus comprising:

a speech-keyword extracting unit that extracts words of the operator as speech keywords from response data on a record of contents that the operator has spoken in response to an inquiry from a customer while referring to case data;

a response-keyword extracting unit that extracts response keywords from the case data corresponding to a response to the inquiry;

a support-keyword extracting unit that matches the speech keywords with the response keywords to detect a common keyword, and extracts a support keyword from the speech keywords that appears in the response data at a time near appearance of the common keyword and that does not match the response keywords; and an auxiliary-data generating unit that generates auxiliary data that includes case identification information uniquely identifying the case data, a customer level indicating a knowledge level of the customer about the inquiry, and the support keyword.

10. The operator supporting apparatus according to claim 9, further comprising:

a best auxiliary-data storage unit that stores best auxiliary data selected from a plurality of auxiliary data with identical case identification information and an equal customer level;

a determining unit that detects the best auxiliary data with the case identification information and the customer level identical to those of new auxiliary data from the best auxiliary-data storage unit, and determines whether the new auxiliary data is superior to the best auxiliary data; and a best auxiliary-data updating unit that updates the best auxiliary data with the new auxiliary data when the new auxiliary data is superior to the best auxiliary data.

11. The operator supporting apparatus according to claim 10, further comprising:

a customer-level acquiring unit that acquires the customer level of the customer to whom the operator is responding;

a case-identification information acquiring unit that acquires the case identification information on the case data which is referred to with respect to the inquiry; and a support-data generating unit that acquires the best auxiliary data including acquired customer level and acquired case identification information to generate support data for supporting the operator based on the best auxiliary data and the case data.

12. The operator supporting apparatus according to claim 11, wherein the case data includes a plurality of response sentences each including the response keyword, the response sentences being arranged according to a plurality of procedures, the support-keyword extracting unit detects the common keyword with respect to each of the procedures, and extracts the support keyword from the speech keywords that appears in a procedure where the common keyword appears and that does not match the response keywords, the auxiliary-data generating unit generates the auxiliary data that further includes support-procedure identification information uniquely identifying the procedure where the support keyword appears, and the support-data generating unit generates the support data so that a response sentence in a procedure identified by the support-procedure identification information contained in the best auxiliary data is displayed in association with the support keyword.

13. An operator supporting method for supporting an operator who responds to an inquiry from a customer while referring to case data, the operator supporting method comprising:

extracting words of the operator as speech keywords from response data on a record of contents that the operator has spoken in response to an inquiry from a customer while referring to case data;

extracting response keywords from the case data corresponding to a response to the inquiry;

detecting a common keyword in the speech and response keywords by matching the speech keywords with the response keywords;

extracting a support keyword from the speech keywords that appears in the response data at a time near appearance of the common keyword and that does not match the response keywords; and generating auxiliary data that includes case identification information uniquely identifying the case data, a customer level indicating a knowledge level of the customer about the inquiry, and the support keyword.

14. The operator supporting method according to claim 13 further comprising:

storing best auxiliary data selected from a plurality of auxiliary data with identical case identification information and an equal customer level;

detecting the best auxiliary data with the case identification information and the customer level identical to those of new auxiliary data;

determining whether the new auxiliary data is superior to the best auxiliary data; and storing the new auxiliary data as the best auxiliary data when the new auxiliary data is superior to the best auxiliary data.

15. The operator supporting method according to claim 14 further comprising:

acquiring the customer level of the customer to whom the operator is responding;

acquiring the case identification information on the case data which is referred to with respect to the inquiry;

acquiring the best auxiliary data including acquired customer level and acquired case identification information; and generating support data for supporting the operator based on the best auxiliary data and the case data.

16. The operator supporting method according to claim 15, wherein the case data includes a plurality of response sentences each including the response keyword, the response sentences being arranged according to a plurality of procedures, the detecting a common keyword includes detecting the common keyword with respect to each of the procedures;

the extracting a support keyword includes extracting the support keyword from the speech keywords that appears in a procedure where the common keyword appears and that does not match the response keywords, the auxiliary data further includes support-procedure identification information that uniquely identifies the procedure where the support keyword appears, and a response sentence in a procedure identified by the support-procedure identification information contained in the best auxiliary data is displayed in association with the support keyword.

* * * * *

UNITED STATES PATENT AND TRADEMARK OFFICE
CERTIFICATE OF CORRECTION

PATENT NO.         : 7,536,003 B2
APPLICATION NO. : 11/648534
DATED              : May 19, 2009
INVENTOR(S)        : Sachiko Onodera et al.

Page 1 of 1

It is certified that error appears in the above-identified patent and that said Letters Patent is hereby corrected as shown below:

Column 24, Line 3, change "acquiring." to --acquiring--.

Signed and Sealed this

Twenty-fifth Day of August, 2009

David J. Kappos
*Director of the United States Patent and Trademark Office*